US012385225B2

(12) United States Patent
Horii et al.

(10) Patent No.: US 12,385,225 B2
(45) Date of Patent: Aug. 12, 2025

(54) HYDRAULIC SYSTEM OF WORKING MACHINE

(71) Applicant: KUBOTA CORPORATION, Osaka (JP)

(72) Inventors: Hiroshi Horii, Osaka (JP); Hiroya Mori, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/738,273

(22) Filed: Jun. 10, 2024

(65) Prior Publication Data

US 2024/0328119 A1 Oct. 3, 2024

Related U.S. Application Data

(63) Continuation of application No. PCT/JP2022/046438, filed on Dec. 16, 2022.

(30) Foreign Application Priority Data

Dec. 28, 2021 (JP) ................................. 2021-214939

(51) Int. Cl.
*E02F 9/22* (2006.01)
*F15B 21/045* (2019.01)

(52) U.S. Cl.
CPC ............ *E02F 9/2228* (2013.01); *E02F 9/226* (2013.01); *F15B 21/045* (2013.01)

(58) Field of Classification Search
CPC ........ E02F 9/2228; E02F 9/226; F15B 21/045
See application file for complete search history.

(56) References Cited

U.S. PATENT DOCUMENTS

| | | | | |
|---|---|---|---|---|
| 2009/0234508 | A1 * | 9/2009 | Kallfass | E02F 9/2267 700/282 |
| 2018/0059069 | A1 * | 3/2018 | Ge | G01N 29/036 |
| 2018/0142800 | A1 * | 5/2018 | Kato | H01F 7/1844 |
| 2020/0357552 | A1 * | 11/2020 | Suzuki | F15B 21/008 |

FOREIGN PATENT DOCUMENTS

| | | | | |
|---|---|---|---|---|
| JP | 2-300581 | A | | 12/1990 |
| JP | 5-79503 | A | | 3/1993 |
| JP | 05079503 | A | * | 3/1993 |
| JP | 2009-228794 | A | | 10/2009 |
| JP | 2021175911 | A | * | 11/2021 |

OTHER PUBLICATIONS

International Search Report dated Feb. 21, 2023 in World Intellectual Property Organization Patent Application No. PCT/JP2022/046438 with an English translation thereof.
Written Opinion dated Feb. 21, 2023 in World Intellectual Property Organization Patent Application No. PCT/JP2022/046438 with an English translation thereof.

* cited by examiner

*Primary Examiner* — Thomas E Lazo
(74) *Attorney, Agent, or Firm* — GREENBLUM & BERNSTEIN, P.L.C.

(57) ABSTRACT

A hydraulic system of a working machine includes a hydraulic actuator to be driven with a hydraulic fluid; a solenoid proportional valve to control the hydraulic actuator in accordance with a current that is supplied; and a controller to control the current that is supplied to the solenoid proportional valve. The controller changes a dither amplitude of the current that is supplied to the solenoid proportional valve in accordance with a temperature of the hydraulic fluid.

13 Claims, 13 Drawing Sheets

Fig.5

DT

| Temperature section (°C) | Dither amplitude (mA) |
|---|---|
| TC1: Lower than 30°C | DA1 |
| TC2: 30°C or higher and lower than 50°C | DA2 |
| TC3: 50°C or higher | DA3 |

DA1 > DA2 > DA3

HYDRAULIC SYSTEM OF WORKING MACHINE

CROSS REFERENCE TO RELATED APPLICATIONS

This application is a continuation application of International Application No. PCT/JP2022/046438, filed on Dec. 16, 2022, which claims the benefit of priority to Japanese Patent Application No. 2021-214939, filed on Dec. 28, 2021. The entire contents of each of these applications are hereby incorporated herein by reference.

BACKGROUND OF THE INVENTION

1. Field of the Invention

The present invention relates to a hydraulic system of a working machine such as a backhoe.

2. Description of the Related Art

Japanese Unexamined Patent Application Publication No. 2009-228794 discloses a working machine including a hydraulic actuator, a control valve that supplies a hydraulic fluid to the hydraulic actuator in accordance with a pilot pressure, a proportional solenoid valve that controls the pilot pressure of the control valve, and a control unit that controls a current of the proportional solenoid valve. The control unit supplies a dither current to the proportional solenoid valve.

SUMMARY OF THE INVENTION

With the technique of Japanese Unexamined Patent Application Publication No. 2009-228794, a dither amplitude is superimposed on the current that is supplied to the solenoid proportional valve to reduce hysteresis of the solenoid proportional valve, and hence responsiveness can be improved.

However, if the dither amplitude that is superimposed on the current is too small, there is a problem that a sufficient effect of reducing the hysteresis cannot be obtained, and if the dither amplitude is too large, there is a problem that vibration sound is generated in the control valve.

The present invention is made to solve such problems of the related art, and an object of the present invention is to reduce hysteresis of a solenoid proportional valve and prevent or reduce generation of vibration sound.

A hydraulic system of a working machine according to one aspect of the present invention includes a hydraulic actuator to be driven with a hydraulic fluid; a solenoid proportional valve to control the hydraulic actuator in accordance with a current that is supplied; and a controller to control the current that is supplied to the solenoid proportional valve. The controller changes a dither amplitude of the current that is supplied to the solenoid proportional valve in accordance with a temperature of the hydraulic fluid.

The controller may set the dither amplitude to a predetermined first value when the temperature of the hydraulic fluid is a first temperature, and change the dither amplitude to a predetermined second value that is smaller than the first value when the temperature of the hydraulic fluid is a second temperature that is higher than the first temperature.

The controller may divide a temperature range of the hydraulic fluid into a plurality of sections to set a plurality of temperature sections that are arranged in ascending order of the temperature, and decrease stepwise a value of the dither amplitude that is set for each of the plurality of temperature sections in ascending order of the plurality of temperature sections.

The controller may continuously decrease the dither amplitude as the temperature of the hydraulic fluid increases.

The hydraulic system of the working machine may include a direction switching valve including a spool to be movable from a stroke start position to a stroke end position in proportion to a flow rate of the hydraulic fluid that is supplied from the solenoid proportional valve, to supply the hydraulic fluid with an amount corresponding to a position of the spool to the hydraulic actuator. The solenoid proportional valve may switch the flow rate of the hydraulic fluid that is supplied to the direction switching valve by changing of an opening of the solenoid proportional valve in accordance with a magnitude of the current that is supplied from the controller. The controller may change the dither amplitude in accordance with the temperature of the hydraulic fluid when the current that is supplied to the solenoid proportional valve has a maximum current value that maximizes the opening of the solenoid proportional valve or a specific current value that is smaller than the maximum current value by a predetermined value, and set the dither amplitude to a constant value regardless of the temperature of the hydraulic fluid when the current that is supplied to the solenoid proportional valve has neither the maximum current value nor the specific current value.

The hydraulic system of the working machine may include a direction switching valve including a spool to be movable from a stroke start position to a stroke end position, the spool being moved in proportion to a flow rate of the hydraulic fluid that is supplied from the solenoid proportional valve, to supply the hydraulic fluid corresponding to an amount of the movement of the spool to the hydraulic actuator. The controller may change the dither amplitude in accordance with the temperature of the hydraulic fluid when the spool is in the stroke end position or at a predetermined near-side position before the stroke end position, and set the dither amplitude to a constant value regardless of the temperature of the hydraulic fluid when the spool is neither in the stroke end position nor at the near-side position.

The hydraulic system of the working machine may include a control valve in which the solenoid proportional valve and the direction switching valve are integrally configured. The controller may change the dither amplitude of the current that is supplied to the solenoid proportional valve of the control valve to a value determined in accordance with the temperature of the hydraulic fluid.

The hydraulic system of the working machine may include a composite control valve in which a plurality of control valves in each of which the solenoid proportional valve and the direction switching valve are integrally configured are coupled. The controller may change the dither amplitude of the current that is supplied to a plurality of the solenoid proportional valves of the composite control valve to a value determined in accordance with the temperature of the hydraulic fluid.

The hydraulic system of the working machine may include a hydraulic fluid tank to store the hydraulic fluid; and a temperature sensor to detect the temperature of the hydraulic fluid stored in the hydraulic fluid tank. The controller may change the dither amplitude of the current that is supplied to the solenoid proportional valve in accordance with the temperature of the hydraulic fluid detected by the temperature sensor.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 5 is a diagram presenting a data table defining the correspondence relationship between a plurality of temperature sections and dither amplitudes.

DETAILED DESCRIPTION OF THE EXAMPLE EMBODIMENTS

Figure 1:
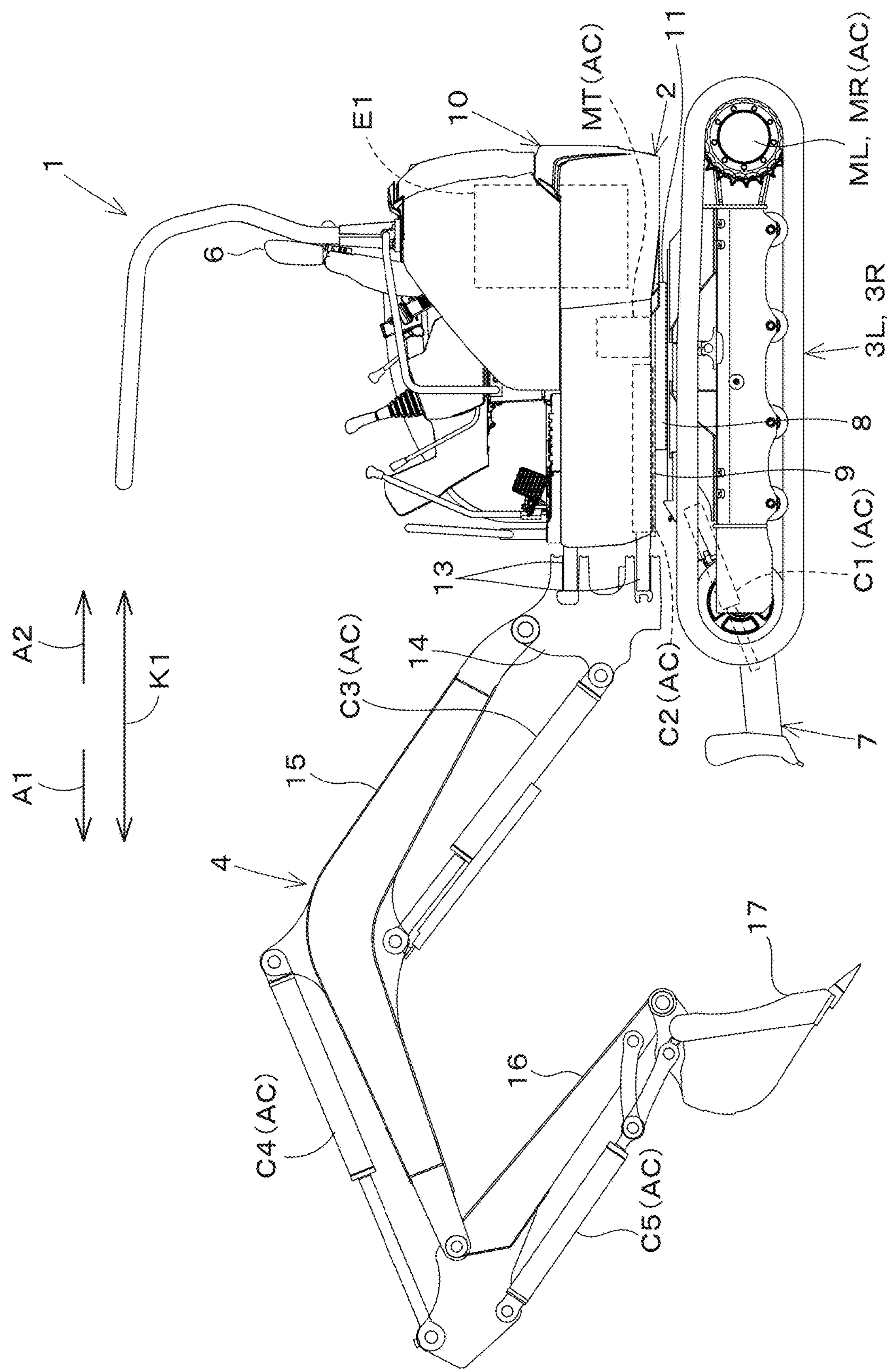
FIG. 1 is a side view of a working machine.

Example embodiments will now be described with reference to the accompanying drawings, wherein like reference numerals designate corresponding or identical elements throughout the various drawings. The drawings are to be viewed in an orientation in which the reference numerals are viewed correctly.

First Embodiment

<Overall Configuration>

FIG. 1 is a side view illustrating an overall configuration of a working machine 1. In the present embodiment, a backhoe, which is a turning working machine, is exemplified as the working machine 1.

As illustrated in FIG. 1, the working machine 1 includes a machine body (turning base) 2, a left traveling device 3L disposed on the left of the machine body 2, a right traveling device 3R disposed on the right of the machine body 2, and a working device 4 attached to a front portion of the machine body 2. An operator's seat 6 on which an operator is seated is provided on the machine body 2.

In the present embodiment, a direction in which the operator seated on the operator's seat 6 of the working machine 1 faces (a direction of arrow A1 in FIG. 1) is referred to as a forward side, and a direction opposite thereto (a direction of arrow A2 in FIG. 1) is referred to as a rearward side. Also, the left of the operator (near side in FIG. 1) is referred to as a leftward side, and the right of the operator (far side in FIG. 1) is referred to as a rightward side. Thus, a direction K1 in FIG. 1 is a front-rear direction (machine-body front-rear direction). Also, a horizontal direction that is a direction orthogonal to the front-rear direction K1 is referred to as a machine-body width direction.

In the present embodiment, the left traveling device 3L and the right traveling device 3R are constituted by crawler type traveling devices. The left traveling device 3L is driven by a traveling motor ML, and the right traveling device 3R is driven by a traveling motor MR. The traveling motors ML and MR are constituted by hydraulic motors (hydraulic actuators AC). A dozer device 7 is attached to a front portion of a traveling frame 11 to which the left traveling device 3L and the right traveling device 3R are attached. The dozer device 7 can be raised/lowered (a blade can be raised/lowered) by extending/contracting a dozer cylinder C1.

The machine body 2 is supported on the traveling frame 11 via a turning bearing 8 so as to be turnable about a vertical axis (an axis extending in an up-down direction). The machine body 2 is driven to turn by a turning motor MT constituted by a hydraulic motor (hydraulic actuator AC).

The machine body 2 includes a turning base plate 9 that turns about the vertical axis and a weight 10 supported on a rear portion of the turning base plate 9. The turning base plate 9 is formed of a steel sheet or the like, and is coupled to the turning bearing 8. A prime mover E1 is mounted in a rear portion of the machine body 2. The prime mover E1 is an engine. Note that the prime mover E1 may be an electric motor or of a hybrid type including an engine and an electric motor.

The machine body 2 includes a support bracket 13 at the front portion. A swing bracket 14 is attached to the support bracket 13 so as to be swingable about a vertical axis. The working device 4 is attached to the swing bracket 14.

The working device 4 includes a boom 15, an arm 16, and a bucket 17 as a working tool. A proximal portion of the boom 15 is pivotally attached to the swing bracket 14 so as to be rotatable about a horizontal axis (an axis extending in the machine-body width direction), and is swingable in the up-down direction. A proximal portion of the arm 16 is pivotally attached to a distal end portion of the boom 15 so as to be rotatable about a horizontal axis, and is swingable in the front-rear direction K1 or in the up-down direction. The bucket 17 is provided at a distal end portion of the arm 16 so as to be capable of performing shoveling and dumping. Instead of or in addition to the bucket 17, another working tool (hydraulic attachment) that can be driven by a hydraulic actuator AC can be attached to the working machine 1.

The swing bracket 14 is swingable by extension/contraction of a swing cylinder C2 provided in the machine body 2. The boom 15 is swingable by extension/contraction of a boom cylinder C3. The arm 16 is swingable by extension/contraction of an arm cylinder C4. The bucket 17 is capable of performing shoveling and dumping by extension/contraction of a bucket cylinder C5 as a working tool cylinder. The dozer cylinder C1, the swing cylinder C2, the boom cylinder C3, the arm cylinder C4, and the bucket cylinder C5 are constituted by hydraulic cylinders (hydraulic actuators AC).

<Hydraulic System of Working Machine>

Figure 2:
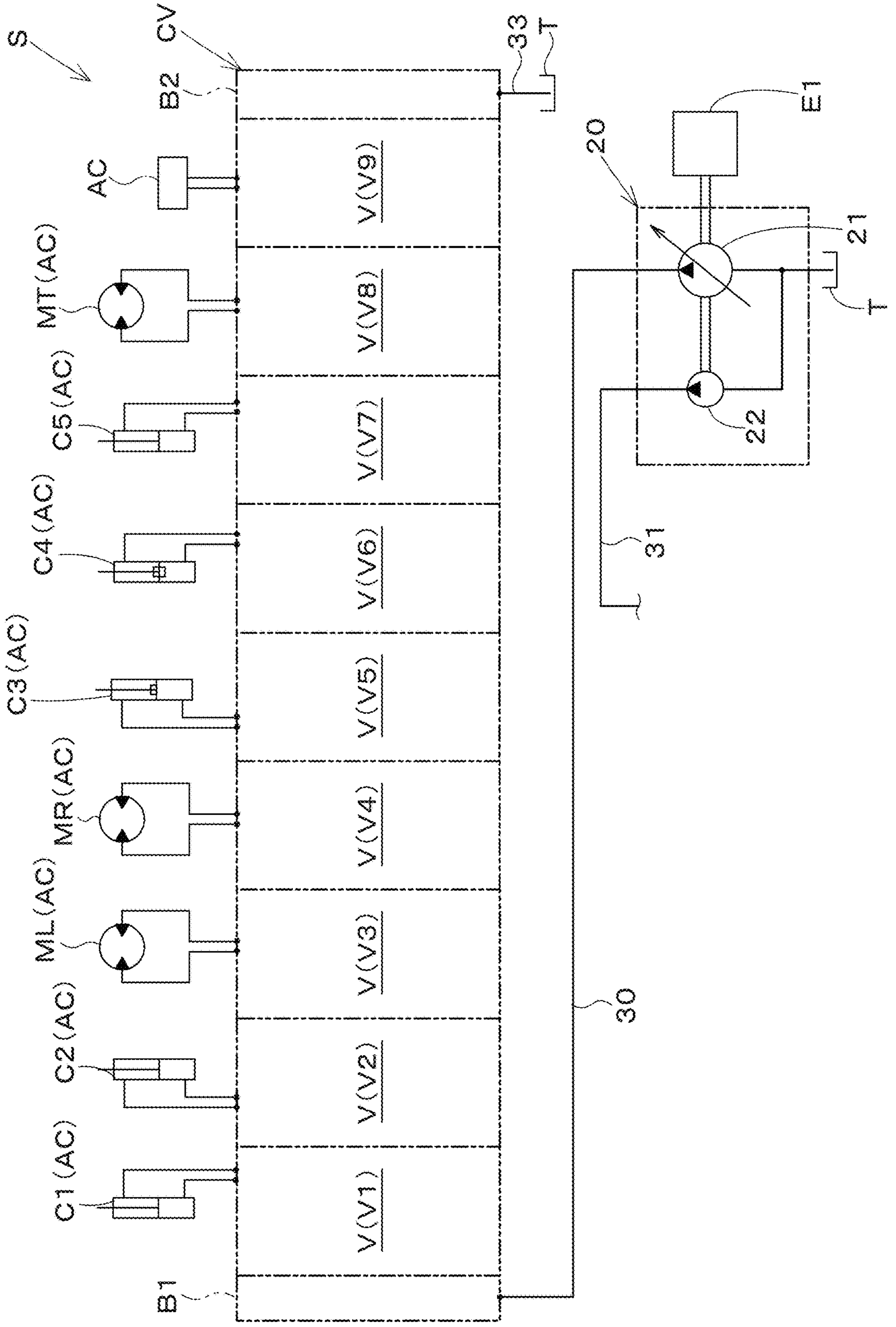
FIG. 2 is a schematic diagram of a hydraulic system of a working machine that drives various hydraulic actuators according to a first embodiment.

FIG. 2 illustrates a schematic configuration of a hydraulic system S of the working machine 1 for actuating the above-described hydraulic actuators AC (MT, ML, MR, C1 to C5). As illustrated in FIG. 2, the hydraulic system S of the working machine 1 includes a hydraulic fluid supply unit 20 and a control valve unit CV.

The hydraulic fluid supply unit 20 is provided with a first pump (main pump) 21 for supplying a hydraulic fluid to actuate a hydraulic actuator AC, and a second pump (pilot pump) 22 for supplying a pilot pressure or a signal pressure such as a detection signal. The first pump 21 and the second pump 22 are driven by the prime mover E1. The first pump 21 is constituted by a variable displacement hydraulic pump (swash-plate variable displacement axial pump) that can change the delivery amount by changing the angle of a swash plate. The second pump 22 is constituted by a constant displacement gear pump. Note that, in the following description, the second pump 22 may be referred to as a "hydraulic pump".

The control valve unit CV is a composite control valve (multiple control valve) in which a plurality of control valves V are coupled. Specifically, the control valve unit CV includes a plurality of control valves V (V1 to V9) that control the various hydraulic actuators AC (MT, ML, MR, C1 to C5) that are driven with the hydraulic fluid, an inlet block B1, and an outlet block B2 that are disposed (stacked) in one direction, coupled to each other, and connected to each other by internal fluid passages.

As illustrated in FIG. 2, the hydraulic system S of the working machine 1 includes a delivery fluid passage 30 and a supply fluid passage 31. The delivery fluid passage 30 is a fluid passage that connects the first pump 21 and the inlet block B1 to each other. Thus, the delivery fluid from the first pump 21 is supplied to the inlet block B1 via the delivery fluid passage 30, and then supplied to each of the control valves V (V1 to V9).

The supply fluid passage 31 is a fluid passage that supplies the hydraulic fluid (delivery fluid) delivered from the second pump 22 to a primary side of a control valve V as a pilot source pressure. The plurality of control valves V each change the switch position of a spool in accordance with the pilot pressure that is supplied via the supply fluid passage 31, thereby switching the delivery amount (output) of the hydraulic fluid supplied from the delivery fluid passage 30 to the corresponding hydraulic actuator AC and the delivery direction of the hydraulic fluid to control the hydraulic actuator AC.

As illustrated in FIG. 2, the control valves V include a dozer control valve V1 that controls the dozer cylinder C1, a swing control valve V2 that controls the swing cylinder C2, a first travel control valve V3 that controls the traveling motor ML of the left traveling device 3L, a second travel control valve V4 that controls the traveling motor MR of the right traveling device 3R, a boom control valve V5 that controls the boom cylinder C3, an arm control valve V6 that controls the arm cylinder C4, a bucket control valve V7 that controls the bucket cylinder C5, a turn control valve V8 that controls the turning motor MT, and an SP control valve V9 that controls a hydraulic actuator AC provided in a hydraulic attachment when the hydraulic attachment is attached as a working tool to a service port (SP, not illustrated). Note that, in FIG. 2, an example is illustrated in which the control valves V include the one SP control valve V9. However, the control valves V may be configured without including the SP control valve V9, or may include one or more other SP control valves in addition to the SP control valve V9.

Figure 3:
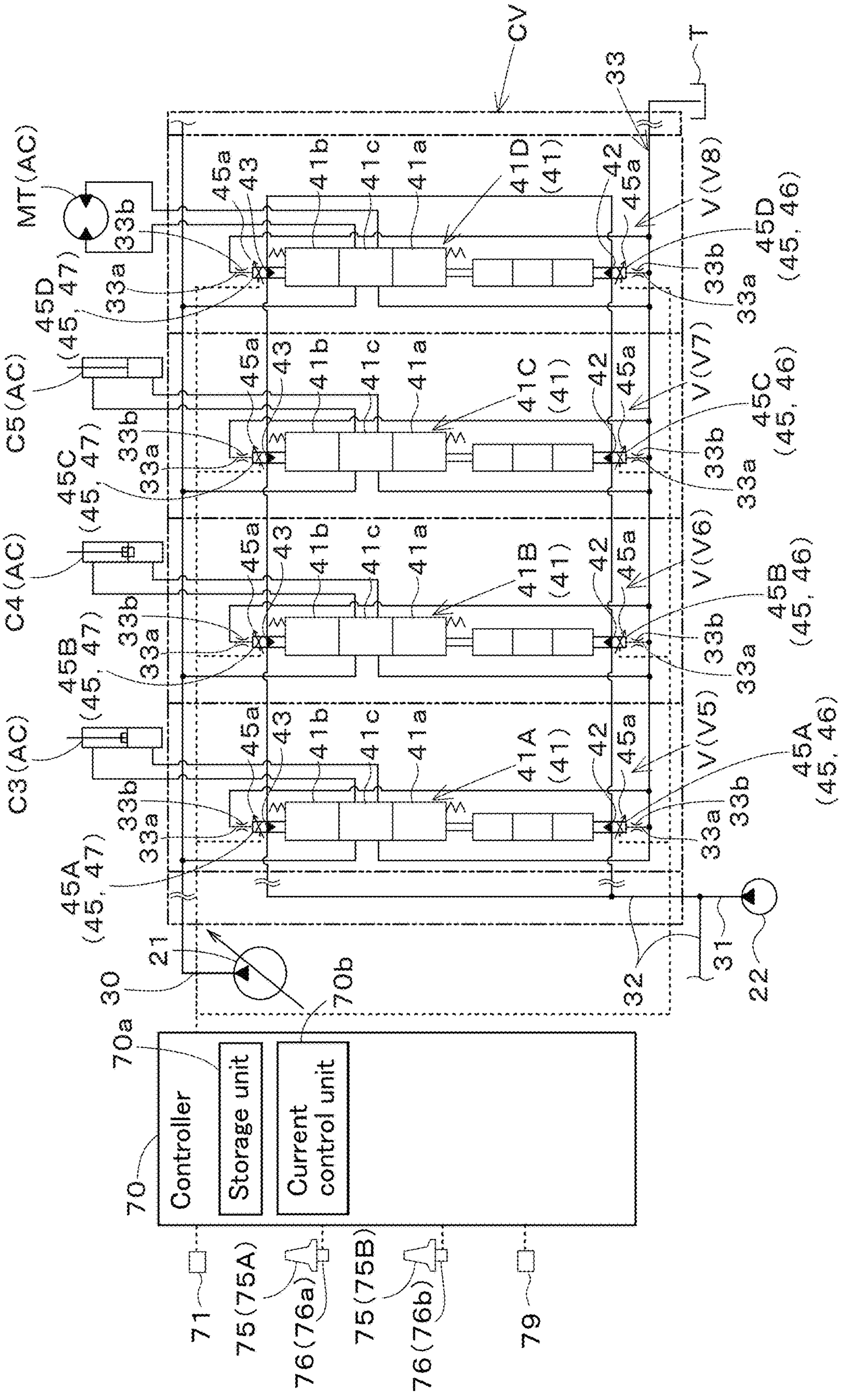
FIG. 3 is a hydraulic circuit diagram relating to a boom control valve, an arm control valve, a bucket control valve, and a turn control valve according to the first embodiment.

FIG. 3 illustrates a schematic configuration of a hydraulic circuit relating to the boom control valve V5, the arm control valve V6, the bucket control valve V7, and the turn control valve V8 according to the first embodiment. At least one of the plurality of control valves Vis a solenoid type three-position switching valve in which the position of a spool is switched with the hydraulic fluid (pilot fluid) supplied from the second pump 22. Specifically, at least one of the plurality of control valves V includes a direction switching valve 41 and a solenoid proportional valve 45, and the solenoid proportional valve 45 changes the opening, thereby changing the pressure of the pilot fluid acting on a spool of the direction switching valve 41 and changing the position of the spool.

In the present embodiment, as illustrated in FIG. 3, the boom control valve V5, the arm control valve V6, the bucket control valve V7, and the turn control valve V8 are solenoid type three-position switching valves each incorporating the above-described solenoid proportional valve 45. That is, the boom control valve V5, the arm control valve V6, the bucket control valve V7, and the turn control valve V8 each include the direction switching valve 41 and the solenoid proportional valve 45.

Note that, in the following description, the direction switching valve 41 included in the boom control valve V5 is referred to as a first switching valve 41A, and the direction switching valve 41 included in the arm control valve V6 is referred to as a second switching valve 41B. Also, the direction switching valve 41 included in the bucket control valve V7 is referred to as a third switching valve 41C, and the direction switching valve 41 included in the turn control valve V8 is referred to as a fourth switching valve 41D.

Also, in the following description, the solenoid proportional valve 45 included in the boom control valve V5 is referred to as a first solenoid valve 45A, and the solenoid proportional valve 45 included in the arm control valve V6 is referred to as a second solenoid valve 45B. Also, the solenoid proportional valve 45 included in the bucket control valve V7 is referred to as a third solenoid valve 45C, and the solenoid proportional valve 45 included in the turn control valve V8 is referred to as a fourth solenoid valve 45D.

The direction switching valve 41 is a direct-acting spool switching valve, and can change a switch position with the hydraulic fluid that is supplied from the solenoid proportional valve 45. The spool of the direction switching valve 41 is moved in proportion to the flow rate of the hydraulic fluid that is supplied from the solenoid proportional valve 45, and the direction switching valve 41 supplies the hydraulic fluid with an amount proportional to an amount of the movement of the spool to a hydraulic actuator AC which is an operation target.

The direction switching valve 41 is switchable among a first position 41*a*, a second position 41*b*, and a neutral position 41*c*. The direction switching valve 41 is held in the neutral position 41*c* by urging forces of a neutral spring on one side in a switching direction and a neutral spring on another side opposite to the one side, and is switched from the neutral position 41*c* to the first position 41*a* or the second position 41*b* with the pressure of the hydraulic fluid that is output from the solenoid proportional valve 45.

Additionally, the direction switching valve 41 includes a first pressure receiver 42 on the one side in the switching direction and a second pressure receiver 43 on the other side. Thus, when the hydraulic fluid supplied from the solenoid proportional valve 45 acts on the first pressure receiver 42, the direction switching valve 41 is switched from the neutral position 41*c* to the first position 41*a*. Also, when the hydraulic fluid supplied from the solenoid proportional valve 45 acts on the second pressure receiver 43, the direction switching valve 41 is switched from the neutral position 41*c* to the second position 41*b*. Accordingly, the direction switching valve 41 can switch the delivery amount (output) of the hydraulic fluid supplied from the delivery fluid passage 30 and the delivery direction of the hydraulic fluid.

A proportional solenoid 45*a* of the solenoid proportional valve 45 is energized when supplied with a current, and hence can change the opening of the solenoid proportional valve 45. Note that a dither amplitude is superimposed on the current that is supplied to the solenoid proportional valve 45. The dither amplitude causes the proportional solenoid 45*a* to move slightly, and the hydraulic fluid acting on a pressure receiver of the direction switching valve 41 from the solenoid proportional valve 45 also pulsates.

As illustrated in FIG. 3, the solenoid proportional valve 45 includes a first pilot valve 46 that supplies the hydraulic fluid to the first pressure receiver 42 of the direction switching valve 41, and a second pilot valve 47 that supplies the hydraulic fluid to the second pressure receiver 43 of the direction switching valve 41 opposite to the first pressure receiver 42. The first pilot valve 46 and the second pilot valve 47 are supplied with the hydraulic fluid delivered from the second pump 22 via the supply fluid passage 31. The first pilot valve 46 is provided with the proportional solenoid 45*a*, and the opening of the first pilot valve 46 is changed by the proportional solenoid 45*a*. The second pilot valve 47 is provided with the proportional solenoid 45*a*, and the opening of the second pilot valve 47 is changed by the proportional solenoid 45*a*.

Specifically, the hydraulic system S of the working machine 1 includes a hydraulic fluid passage 32 connected to the supply fluid passage 31, and a drain fluid passage 33 connected to a hydraulic fluid tank T. The hydraulic fluid passage 32 has a first end portion connected to the supply fluid passage 31, and a second end portion, which is opposite to the first end portion, branched into a plurality of portions and connected to primary-side ports (primary ports) of the solenoid proportional valves 45 (the first pilot valve 46 and the second pilot valve 47). Thus, the hydraulic fluid passage 32 can supply the hydraulic fluid flowing through the supply fluid passage 31 to each of the solenoid proportional valves 45 (the first pilot valve 46 and the second pilot valve 47). That is, the delivery fluid delivered by the second pump 22 is supplied to the solenoid proportional valves 45 via the supply fluid passage 31 and the hydraulic fluid passage 32.

Also, as illustrated in FIG. 3, the drain fluid passage 33 has a first end portion connected to the hydraulic fluid tank T, and a second end portion, which is opposite to the first end portion, branched into a plurality of portions and connected to the solenoid proportional valves 45 and the direction switching valve 41. Specifically, the second end portion of the drain fluid passage 33 is connected to fluid passages between delivery-side ports of the solenoid proportional valves 45 and the pressure receivers (the first pressure receiver 42 and the second pressure receiver 43) of the direction switching valve 41, and to a discharge port of the direction switching valve 41 (a port that discharges the return fluid from the hydraulic actuator AC). Additionally, throttles 33*b* are provided in portions (discharge fluid passages 33*a*) of the drain fluid passage 33, which merge between secondary-side ports (secondary ports) of the solenoid proportional valves 45 and the pressure receivers (the first pressure receiver 42 and the second pressure receiver 43) of the direction switching valve 41.

Thus, the drain fluid passage 33 can discharge part of the hydraulic fluid supplied from the solenoid proportional valves 45 to the pressure receivers (the first pressure receiver 42 and the second pressure receiver 43) of the direction switching valve 41 and the hydraulic fluid discharged from the direction switching valve 41, to the hydraulic fluid tank T. Accordingly, by changing the openings in accordance with the magnitude of the current that is supplied to the solenoid proportional valve 45, the solenoid proportional valves 45 can supply the hydraulic fluid supplied from the hydraulic fluid passage 32 to the pressure receivers (the first pressure receiver 42 and the second pressure receiver 43) of the direction switching valve 41 and discharge the hydraulic fluid to the drain fluid passage 33.

Note that, while the solenoid type three-position switching valve incorporating the solenoid proportional valve 45 is described in this embodiment, the solenoid proportional valve 45 may be formed separately. Also, the plurality of control valves V are not limited to the three-position switching valves, and may be two-position switching valves, four-position switching valves, or the like.

<J/S Operation>

As illustrated in FIG. 3, the hydraulic system S of the working machine 1 includes a controller 70. The controller 70 is a device constituted by a program or the like stored in an electric/electronic circuit, a CPU, an MPU, or the like. The controller 70 controls various devices included in the working machine 1. For example, the controller 70 can control the prime mover E1 and the rotational speed of the prime mover E1 (prime mover rotational speed). Additionally, the controller 70 includes a storage unit 70*a* and a current control unit 70*b*. The storage unit 70*a* is a nonvolatile memory or the like, and stores various pieces of information and the like relating to the control of the controller 70. The current control unit 70*b* controls the current that is supplied to the solenoid proportional valve 45.

The proportional solenoid 45*a* of the solenoid proportional valve 45 is connected to the controller 70, and changes the opening in accordance with the magnitude of the current (current value I, command signal) that is supplied from the controller 70, and supplies the pilot pressure corresponding to the current value I to the direction switching valve 41, thereby switching each direction switching valve 41. Also, a first operation member 75 that operates each direction switching valve 41 is connected to the controller 70.

The first operation member 75 includes a sensor 76 that detects an operation direction and an operation amount. The configuration of the sensor 76 is not particularly limited, and for example, a potentiometer or the like can be used. The sensor 76 is connected to the controller 70 and outputs the detected operation direction and operation amount as detection signals.

The controller 70 supplies the current with the current value I corresponding to the operation amount of the first operation member 75 to the proportional solenoid 45*a* of a solenoid proportional valve 45 which is an operation target.

Specifically, as illustrated in FIG. 3, the controller 70 includes the current control unit 70*b* that controls (defines) a current that is supplied to the solenoid proportional valve 45 (proportional solenoid 45*a*) in accordance with the operation direction and the operation amount of the first operation member 75.

The current control unit 70*b* defines the current (current value I) that is supplied to the solenoid proportional valve 45 (proportional solenoid 45*a*) based on a detection signal output from the sensor 76 to the controller 70 and a control map or a predetermined arithmetic expression stored in the storage unit 70*a* in advance. Accordingly, the controller 70 supplies the current defined by the current control unit 70*b* to the proportional solenoid 45*a* of the solenoid proportional valve 45 which is the operation target.

Also, the current control unit 70*b* superimposes a dither amplitude on the current that is supplied to the solenoid proportional valve 45. That is, it is possible to generate dither by adding an oscillation component to the current that is supplied to the solenoid proportional valve 45. For example, the current control unit 70*b* can set the frequency of pulse width modulation (PWM) that is used for current control to be low and pulsate the current. Alternatively, the current control unit 70*b* may superimpose a dither amplitude on the current by using a method of adding an oscillation component to a current command value.

In the present embodiment, the first operation member 75 includes a first operation actuator 75A and a second operation actuator 75B. The first operation actuator 75A can operate two operation targets provided in the working machine 1, and can operate, for example, the first switching valve 41A and the third switching valve 41C. In other words, the first operation actuator 75A can perform swinging of the boom 15 and swinging of the bucket 17. Additionally, the first operation actuator 75A includes, as the sensor 76, a first sensor 76*a* that detects the operation direction and the operation amount of the first operation actuator 75A. Thus, the current control unit 70*b* defines a current that is supplied to the first solenoid valve 45A and the third solenoid valve 45C based on a detection signal output from the first sensor 76*a*, and the controller 70 supplies the current to the first solenoid valve 45A and the third solenoid valve 45C.

For example, when the first operation actuator 75A is operated in the front-rear direction, the current control unit 70*b* defines a current that is supplied to the first solenoid valve 45A based on a detection signal output from the first sensor 76*a*, and the controller 70 supplies the current to the first solenoid valve 45A. In contrast, when the first operation actuator 75A is operated in the machine-body width direction, the current control unit 70*b* defines a current that is supplied to the third solenoid valve 45C based on a detection signal output from the first sensor 76*a*, and the controller 70 supplies the current to the third solenoid valve 45C. Accordingly, the controller 70 controls the first switching valve 41A and the third switching valve 41C based on the operation of the first operation actuator 75A.

The second operation actuator 75B can operate two operation targets provided in the working machine 1, and can operate, for example, the second switching valve 41B and the fourth switching valve 41D. In other words, the second operation actuator 75B can perform swinging of the arm 16 and turning of the turning motor MT. Additionally, the second operation actuator 75B includes, as the sensor 76, a second sensor 76*b* that detects the operation direction and the operation amount of the second operation actuator 75B. Thus, the current control unit 70*b* defines a current that is supplied to the second solenoid valve 45B and the fourth solenoid valve 45D based on a detection signal output from the second sensor 76*b*, and the controller 70 supplies the current to the second solenoid valve 45B and the fourth solenoid valve 45D.

For example, when the second operation actuator 75B is operated in the front-rear direction, the current control unit 70*b* defines a current that is supplied to the second solenoid valve 45B based on a detection signal output from the second sensor 76*b*, and the controller 70 supplies the current to the second solenoid valve 45B. In contrast, when the second operation actuator 75B is operated in the machine-body width direction, the current control unit 70*b* defines a current that is supplied to the fourth solenoid valve 45D based on a detection signal output from the second sensor 76*b*, and the controller 70 supplies the current to the fourth solenoid valve 45D. Accordingly, the controller 70 controls the second switching valve 41B and the fourth switching valve 41D based on the operation of the second operation actuator 75B.

Note that the first operation actuator 75A and the second operation actuator 75B are constituted by, for example, operation levers that are gripped and operated by the operator seated on the operator's seat 6.

<Pilot Operation>

Figure 4:
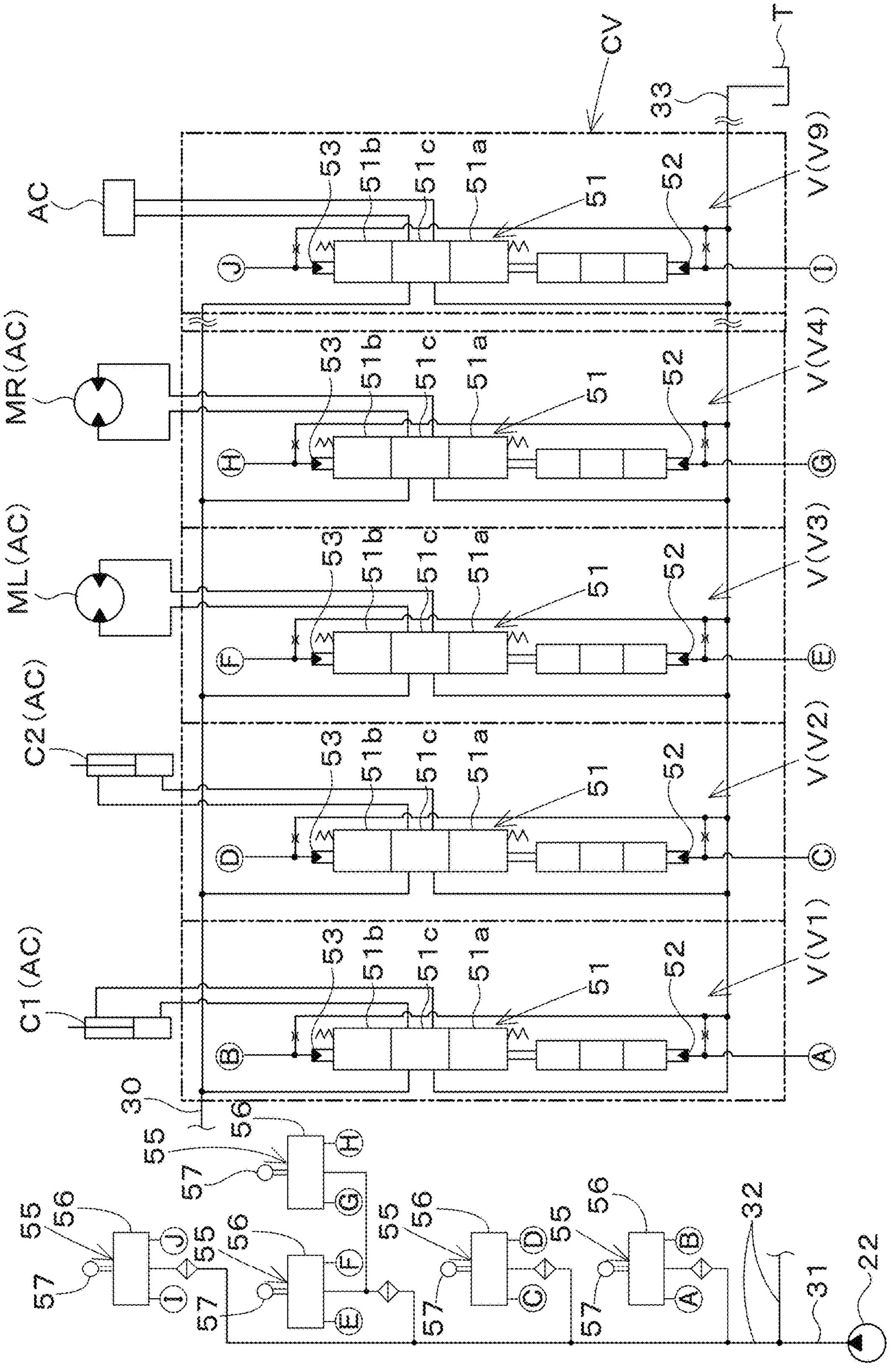
FIG. 4 is a hydraulic circuit diagram relating to a dozer control valve, a swing control valve, a first travel control valve, a second travel control valve, and an SP control valve according to the first embodiment.

In the present embodiment, as illustrated in FIG. 4, the dozer control valve V1, the swing control valve V2, the first travel control valve V3, the second travel control valve V4, and the SP control valve V9 each are constituted by a pilot-operation switching valve 51 that is pilot-operated by an operation device 55.

FIG. 4 is a hydraulic circuit diagram relating to the dozer control valve V1, the swing control valve V2, the first travel control valve V3, the second travel control valve V4, and the SP control valve V9 according to the first embodiment. As illustrated in FIG. 4, the operation device 55 includes a pilot valve 56 that outputs a pilot pressure (pilot fluid) to corresponding one of the control valves V (V1 to V4, V9), and a second operation member 57 that operates the pilot valve 56. The second operation member 57 is constituted by, for example, an operation lever, a pedal, or the like disposed around the operator's seat 6.

The pilot-operation switching valve 51 is switchable among a first position 51*a*, a second position 51*b*, and a neutral position 51*c*. The pilot-operation switching valve 51 is held in the neutral position 51*c* by urging forces of a neutral spring on one side in a switching direction and a neutral spring on another side opposite to the one side, and is switched from the neutral position 51*c* to the first position 51*a* or the second position 51*b* with the pressure of the hydraulic fluid that is output from the pilot valve 56.

Additionally, the pilot-operation switching valve 51 includes a third pressure receiver 52 on the one side in the switching direction and a fourth pressure receiver 53 on the other side. Also, a primary-side port (primary port) of the pilot valve 56 is connected to a second end portion of the hydraulic fluid passage 32, and the hydraulic fluid supplied from the hydraulic fluid passage 32 can be supplied from a secondary-side port (secondary port) to the pressure receivers (the third pressure receiver 52 and the fourth pressure receiver 53) of the pilot-operation switching valve 51.

Thus, when the hydraulic fluid supplied from the pilot valve 56 acts on the third pressure receiver 52, the pilot-operation switching valve 51 is switched from the neutral position 51*c* to the first position 51*a*. Also, when the hydraulic fluid supplied from the pilot valve 56 acts on the fourth pressure receiver 53, the pilot-operation switching valve 51 is switched from the neutral position 51*c* to the second position 51*b*. Accordingly, the pilot-operation switching valve 51 can switch the delivery amount (output) of the hydraulic fluid supplied from the delivery fluid passage 30 and the delivery direction of the hydraulic fluid.

Note that, in the hydraulic system S of the working machine 1, at least one or more of the plurality of control valves V may be control valves V incorporating the solenoid proportional valves 45, and the control valves V incorporating the solenoid proportional valves 45 are not limited to the boom control valve V5, the arm control valve V6, the bucket control valve V7, and the turn control valve V8. For example, the control valve V incorporating the solenoid proportional valve 45 may be any of the dozer control valve V1, the swing control valve V2, the first travel control valve V3, the second travel control valve V4, and the SP control valve V9, and the combination thereof is not limited.

<Change of Dither Amplitude in Accordance with Temperature of Hydraulic Fluid>

In the hydraulic system S of the working machine 1, the current control unit 70*b* changes the dither amplitude of the current that is supplied to the solenoid proportional valve 45 in accordance with the temperature of the hydraulic fluid. For example, the hydraulic system S of the working machine 1 includes a temperature sensor 79 that detects the temperature of the hydraulic fluid stored in the hydraulic fluid tank T, and the current control unit 70*b* changes the dither amplitude of the current that is supplied to the solenoid proportional valve 45 in accordance with the temperature of the hydraulic fluid detected by the temperature sensor 79. Note that the arrangement position of the temperature sensor 79 is not limited to the hydraulic fluid tank T, and the temperature sensor 79 may be disposed in the control valve unit CV, the supply fluid passage 31, the hydraulic fluid passage 32, the drain fluid passage 33, or the like.

Specifically, the current control unit 70*b* sets the dither amplitude to a predetermined first value when the temperature of the hydraulic fluid is a first temperature (or in a first temperature range), and changes the dither amplitude to a predetermined second value that is smaller than the first value when the temperature of the hydraulic fluid is a second temperature (or in a second temperature range) that is higher than the first temperature. More specifically, as presented in FIG. 5, the current control unit 70*b* divides a temperature range of the hydraulic fluid into a plurality of sections to set a plurality of temperature sections that are arranged in ascending order of the temperature, and sets a value of the dither amplitude that is set for each of the plurality of temperature sections to decrease stepwise in ascending order of the plurality of temperature sections. FIG. 5 is a diagram presenting an example of a data table DT defining the correspondence relationship between a plurality of temperature sections TC1 to TC3 and dither amplitudes DA1 to DA3.

The storage unit 70*a* stores in advance a data table DT presented in FIG. 5 in which the dither amplitudes DA1 to DA3 are set for the plurality of temperature sections TC1 to TC3, respectively. The dither amplitudes DA1 to DA3 decrease in the order of the dither amplitude DA1>the dither amplitude DA2>the dither amplitude DA3. The dither amplitudes DA1 to DA3 are fixed values each indicating a single current value (mA). The temperature section TC1 is a section of "lower than 30° C.", and the dither amplitude DA1 is set. The temperature section TC2 is a section of "30° C. or higher and lower than 50° C.", and the dither amplitude DA2 is set. The temperature section TC3 is a section of "50° C. or higher", and the dither amplitude DA3 is set. In this embodiment, the three temperature sections TC1 to TC3 are provided. However, the plurality of temperature sections may be a plurality of temperature sections other than the three temperature sections. Also, respective thresholds of the temperature sections are not limited to 30° C. and 50° C., and may be set as appropriate in accordance with the characteristics or the like of the hydraulic fluid or the solenoid proportional valve 45.

Note that the dither amplitudes DA1 to DA3 are set so that hysteresis of the solenoid proportional valve 45 can be sufficiently reduced and vibration sound caused by the dither amplitude of the current can be reduced in the corresponding temperature section. Specifically, the hysteresis of the solenoid proportional valve 45 is a difference between an output hydraulic pressure when the current that is supplied to the solenoid proportional valve 45 is increased and an output hydraulic pressure when the current that is supplied to the solenoid proportional valve 45 is decreased, and the hysteresis increases as the temperature of the hydraulic fluid decreases. In contrast, the vibration sound caused by the dither amplitude is more likely to be generated as the temperature of the hydraulic fluid increases. Thus, in the present embodiment, the dither amplitude that is superimposed on the current that is supplied to the solenoid proportional valve 45 is set to an amplitude within a range in which the hysteresis of the solenoid proportional valve 45 can be sufficiently reduced (to a level in which reduction in responsiveness can be sufficiently prevented or reduced) and the generation of the vibration sound caused by the dither amplitude can be sufficiently prevented or reduced, in accordance with the temperature of the hydraulic fluid.

Also, the current control unit 70*b* determines whether or not the prime mover E1 is being driven based on a signal for starting the prime mover E1 output from an ignition switch 71 to the controller 70.

The ignition switch 71 is a switch for starting the prime mover E1. The ignition switch 71 is connected to the controller 70, and the controller 70 starts and stops the prime mover E1 based on signals (a start signal and a stop signal) output from the ignition switch 71.

<Control Process on Dither Amplitude in Accordance with Temperature of Hydraulic Fluid>

Figure 6:
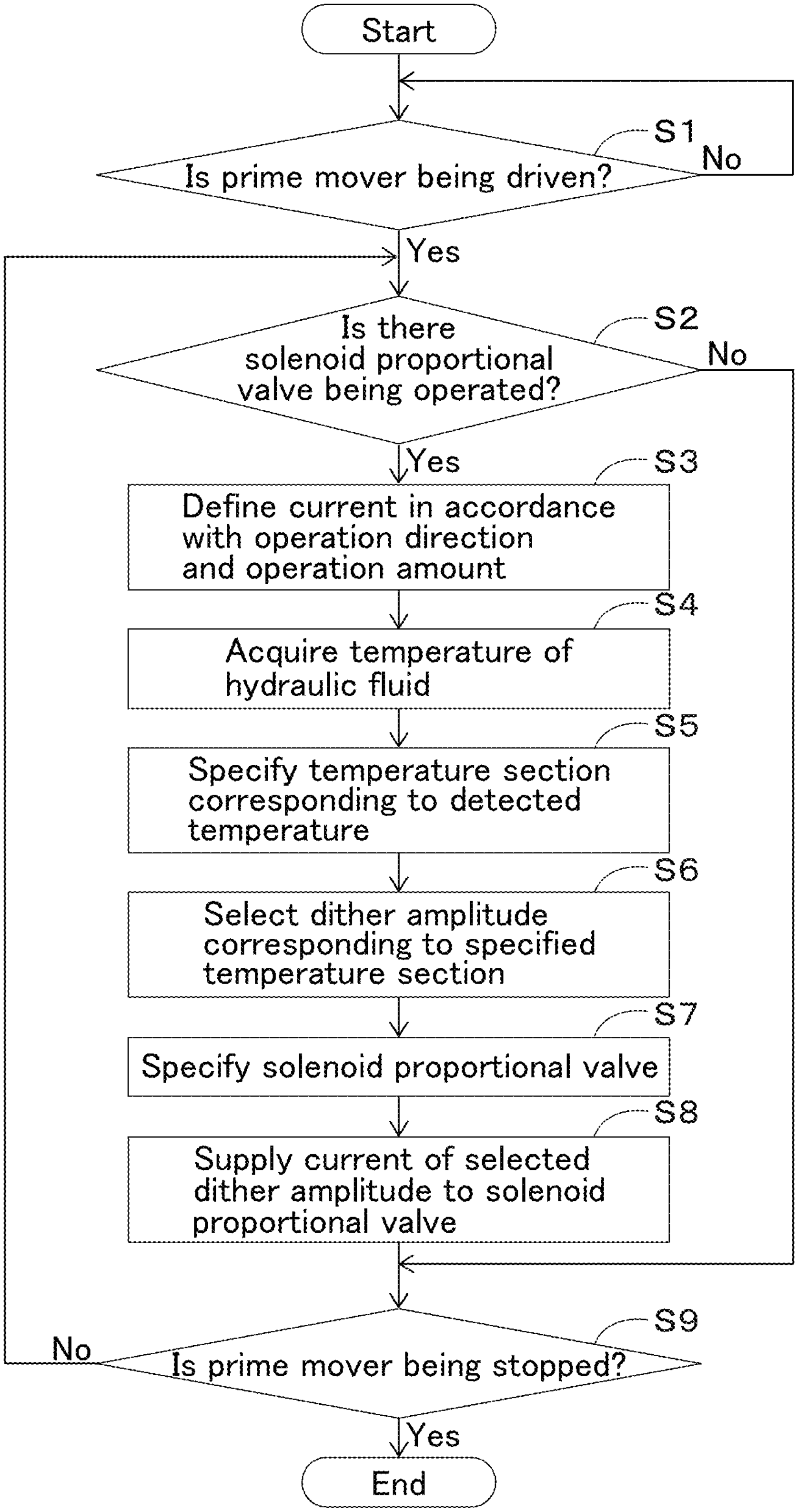
FIG. 6 is a flowchart presenting a control process on a dither amplitude in accordance with the temperature of a hydraulic fluid by a current control unit.

Hereinafter, a process of setting the dither amplitude of the current based on the temperature of the hydraulic fluid by the current control unit 70*b* will be described in detail with reference to FIG. 6. FIG. 6 is a flowchart presenting a control process on the dither amplitude in accordance with the temperature of the hydraulic fluid by the current control unit 70*b*.

First, the current control unit 70*b* determines whether or not the prime mover E1 is being driven (S1).

When determining that the prime mover E1 is being driven (S1, Yes), the current control unit 70*b* determines whether or not there is a solenoid proportional valve 45 being operated by the first operation member 75 (S2).

When determining that there is the solenoid proportional valve 45 being operated by the first operation member 75 (S2, Yes), the current control unit 70*b* defines a current that is supplied to the solenoid proportional valve 45 in accordance with the operation direction and the operation amount of the first operation member 75 (S3).

Then, the current control unit 70*b* acquires the temperature of the hydraulic fluid detected by the temperature sensor 79 (S4), specifies the temperature section corresponding to the acquired temperature of the hydraulic fluid (S5), and selects the dither amplitude corresponding to the specified temperature section (S6).

Also, the current control unit 70*b* specifies the solenoid proportional valve 45 being operated by the first operation member 75 in S3 (S7).

Then, the current control unit 70*b* supplies a current obtained by superimposing the dither amplitude selected in S6 on the current defined in S3 to the solenoid proportional valve 45 specified in S7 (S8).

After the processing in S8 and when determining that there is no solenoid proportional valve 45 being operated in S2 (S2, No), the current control unit 70*b* determines whether or not the prime mover E1 is being stopped (S9). Specifically, the current control unit 70*b* determines whether or not the prime mover E1 is being driven, based on a signal (stop signal) output from the ignition switch 71 to the controller 70.

When the controller 70 confirms that the stop signal has been output from the ignition switch 71 and determines that the prime mover E1 is being stopped (S9, Yes), the current control unit 70*b* ends the present process. In contrast, when the controller 70 confirms that the stop signal has not been output from the ignition switch 71 and determines that the prime mover E1 is not being stopped (S9, No), the current control unit 70*b* returns to S2 and repeats the processing in S2 and later.

<Effects>

A hydraulic system S of a working machine 1 of the above-described first embodiment includes a hydraulic actuator AC to be driven with a hydraulic fluid; a solenoid proportional valve 45, in which a proportional solenoid 45*a* is energized in accordance with a current that is supplied, to control the hydraulic actuator AC; and a controller 70 to control the current that is supplied to the solenoid proportional valve 45. The controller 70 includes a current control unit 70*b* to change a dither amplitude of the current that is supplied to the solenoid proportional valve 45 in accordance with a temperature of the hydraulic fluid. According to this configuration, the current control unit 70*b* changes the dither amplitude of the current that is supplied to the solenoid proportional valve 45 in accordance with the temperature of the hydraulic fluid, and hence hysteresis of the solenoid proportional valve 45 can be reduced and vibration sound caused by the solenoid proportional valve 45 can be reduced.

Additionally, the current control unit 70*b* sets the dither amplitude to a predetermined first value when the temperature of the hydraulic fluid is a first temperature, and changes the dither amplitude to a predetermined second value that is smaller than the first value when the temperature of the hydraulic fluid is a second temperature that is higher than the first temperature. According to this configuration, when the temperature of the hydraulic fluid increases from the first temperature to the second temperature, the dither amplitude is changed to the second value that is smaller than the first value, and hence the vibration sound generated or increased due to the solenoid proportional valve 45 can be reduced.

Additionally, the current control unit 70*b* divides a temperature range of the hydraulic fluid into a plurality of sections to set a plurality of temperature sections TC1 to TC3 that are arranged in ascending order of the temperature, and decreases stepwise a value of the dither amplitude that is set for each of the plurality of temperature sections TC1 to TC3 in ascending order of the plurality of temperature sections TC1 to TC3. According to this configuration, the dither amplitude is decreased stepwise in the ascending order of the plurality of temperature sections TC1 to TC3 of the hydraulic fluid, and hence the hysteresis of the solenoid proportional valve 45 can be reduced and the vibration sound caused by the solenoid proportional valve 45 can be reduced.

Additionally, the hydraulic system S includes a control valve unit CV (composite control valve: multiple control valve) in which a plurality of control valves V (V1 to V9) in each of which the solenoid proportional valve 45 and the direction switching valve 41 are integrally configured are coupled. The current control unit 70*b* changes the dither amplitude of the current that is supplied to a plurality of the solenoid proportional valves 45 of the control valve unit CV to a value determined in accordance with the temperature of the hydraulic fluid. According to this configuration, vibration sound caused by a spool of each direction switching valve 41 can be reduced, and hence vibration sound of the entire control valve unit CV (composite control valve) can be reduced. That is, the vibration sound of the control valve unit CV (composite control valve) caused by the temperature of the hydraulic fluid can be effectively reduced.

Additionally, the hydraulic system S includes a hydraulic fluid tank T to store the hydraulic fluid; and a temperature sensor 79 to detect the temperature of the hydraulic fluid stored in the hydraulic fluid tank T. The current control unit 70*b* changes the dither amplitude of the current that is supplied to the solenoid proportional valve 45 in accordance with the temperature of the hydraulic fluid detected by the temperature sensor 79. According to this configuration, the dither amplitude can be changed using the temperature of the hydraulic fluid stored in the hydraulic fluid tank T in which the temperature changes relatively gently. Thus, the dither amplitude can be changed stably without being affected by a local change in temperature of the working machine.

Second Embodiment

Hereinafter, a hydraulic system S of a working machine 1 of a second embodiment will be described focusing on a configuration different from the configuration of the above-described embodiment (first embodiment). The same reference signs are given to the configurations common to the configurations of the first embodiment and the detailed description thereof will be omitted.

In the first embodiment, the dither amplitude of the current is changed stepwise in accordance with the temperature section of the hydraulic fluid. However, the second embodiment is different from the first embodiment in that the dither amplitude of the current is continuously changed in accordance with the temperature of the hydraulic fluid.

In the second embodiment, the current control unit 70*b* continuously decreases the dither amplitude as the temperature of the hydraulic fluid increases.

Figure 7A:
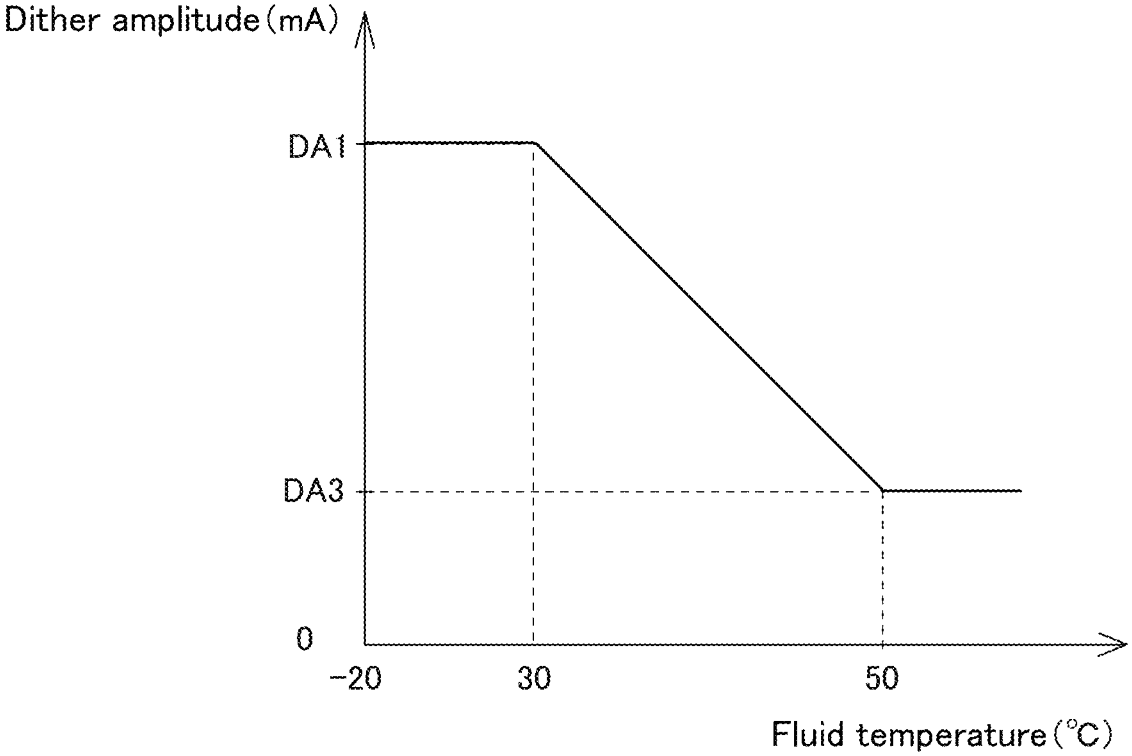
FIG. 7A is a characteristic diagram presenting the correspondence relationship between the fluid temperature and the dither amplitude.

FIG. 7A is a characteristic diagram presenting the correspondence relationship between the fluid temperature and the dither amplitude. The storage unit 70*a* stores in advance characteristic data presented in FIG. 7A in which the fluid temperature and the dither amplitude are associated with each other in a one-to-one correspondence. The characteristic data presented in FIG. 7A indicates, for example, data in which the dither amplitude is a dither amplitude DA1 when the fluid temperature is "from −20° C. to 30° C.", the dither amplitude continuously changes (changes with a linear downward gradient) from the dither amplitude DA1 to a dither amplitude DA3 when the fluid temperature is in a range of "from 30° C. to 50° C.", and the dither amplitude is constant at the dither amplitude DA3 when the fluid temperature is "50° C." or higher. Thus, the current control unit 70*b* can specify the dither amplitude corresponding to the fluid temperature detected by the temperature sensor 79 using the characteristic data presented in FIG. 7A and stored in the storage unit 70*a*. Note that the storage unit 70*a* may store in advance a characteristic expression representing the characteristic data presented in FIG. 7A, and may calculate the dither amplitude corresponding to the fluid temperature using the characteristic expression and the fluid temperature detected by the temperature sensor 79.

Figure 7B:
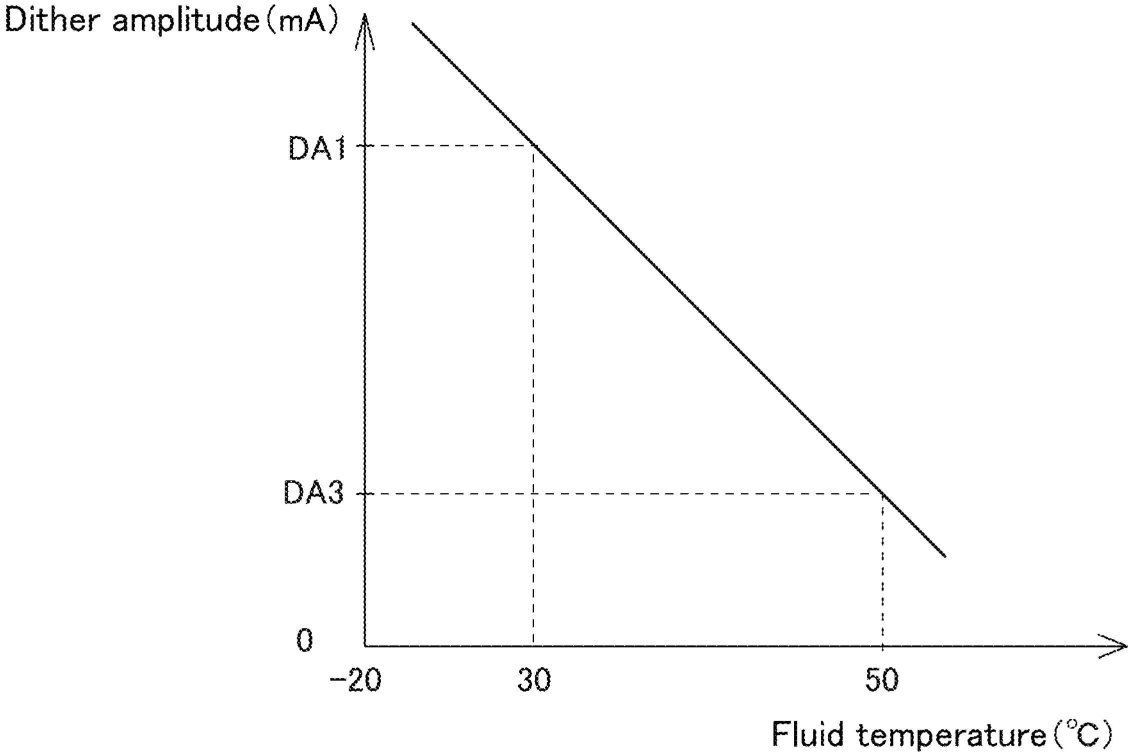
FIG. 7B is a characteristic diagram of another example presenting the correspondence relationship between the fluid temperature and the dither amplitude.

Note that the storage unit 70*a* may be one that stores in advance characteristic data that exhibits a characteristic diagram of another example presented in FIG. 7B. FIG. 7B is a characteristic diagram of another example presenting the correspondence relationship between the fluid temperature and the dither amplitude. Compared to the characteristic data presented in FIG. 7A, the characteristic data presented in FIG. 7B is different from the characteristic data presented in FIG. 7A in that the dither amplitude continuously changes also in the range of the fluid temperature "from −20° C. to 30° C." and in the range of the fluid temperature of "50° C." or higher. Note that the characteristic data presented in FIGS. 7A and 7B do not have to change in a linear form, and may change in a curved form.

<Control Process on Dither Amplitude in Accordance with Temperature of Hydraulic Fluid>

Figure 8:
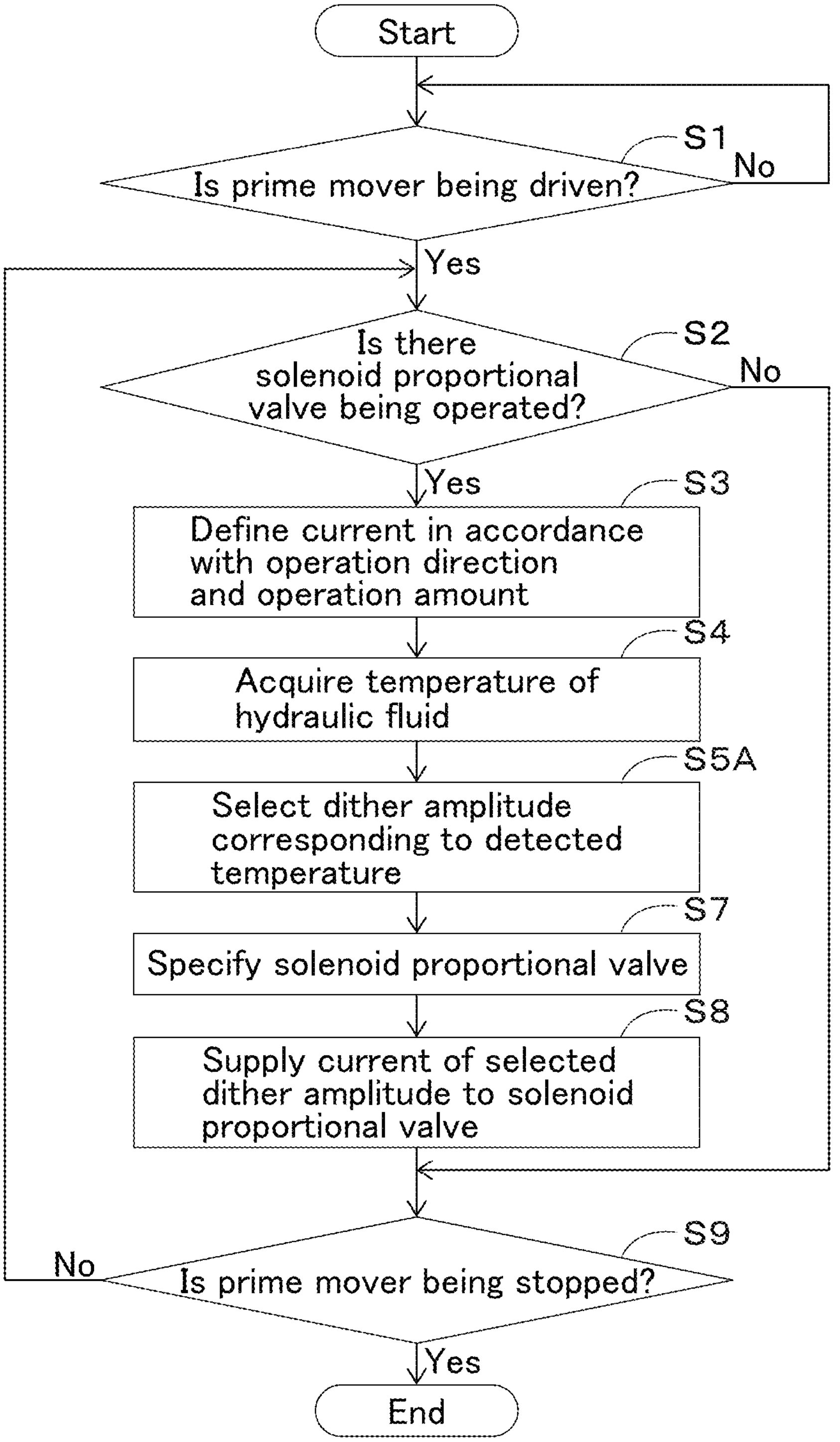
FIG. 8 is a flowchart presenting a control process on the dither amplitude in accordance with the temperature of the hydraulic fluid by the current control unit.

FIG. 8 is a flowchart presenting a control process on the dither amplitude in accordance with the temperature of the hydraulic fluid by the current control unit 70*b*. The flowchart presented in FIG. 8 is different from the flowchart presented in FIG. 6 in that S5 and S6 in the flowchart presented in FIG. 6 are deleted and SA is provided instead of S5.

As presented in FIG. 8, when acquiring the temperature of the hydraulic fluid detected by the temperature sensor 79 (S4), the current control unit 70*b* selects (or calculates) a dither amplitude corresponding to the detected temperature (S5A). S7 to S9 are the same as those in the first embodiment, and hence the description thereof will be omitted here.

<Effects>

In the hydraulic system S of the working machine 1 of the above-described second embodiment, the current control unit 70*b* continuously decreases the dither amplitude as the temperature of the hydraulic fluid increases. Thus, the hysteresis of the solenoid proportional valve 45 and the vibration sound caused by the solenoid proportional valve 45 can be more appropriately reduced.

Third Embodiment

Hereinafter, a hydraulic system S of a working machine 1 of a third embodiment will be described focusing on a configuration different from the configuration of the above-described embodiments (first and second embodiments). The same reference signs are given to the configurations common to the configurations of the first and second embodiments and the detailed description thereof will be omitted.

The third embodiment is different from the first and second embodiments in that the dither amplitude of the current is changed in accordance with the temperature section of the hydraulic fluid in the first and second embodiments, whereas in the third embodiment, the dither amplitude is changed in accordance with the temperature of the hydraulic fluid when the current of the solenoid proportional valve 45 has a maximum current value or a specific current value, and the dither amplitude is not changed regardless of the temperature of the hydraulic fluid when the current of the solenoid proportional valve 45 has neither the maximum current value nor the specific current value.

The direction switching valve 41 includes a spool to be movable from a stroke start position to a stroke end position by changing of the opening of the solenoid proportional valve 45 in accordance with the magnitude of the current that is supplied from the current control unit 70*b*. The spool is moved in proportion to the flow rate of the hydraulic fluid that is supplied from the solenoid proportional valve 45, and the direction switching valve 41 supplies the hydraulic fluid with an amount proportional to an amount of the movement of the spool to the hydraulic actuator AC. The direction switching valve 41 is the same as the direction switching valve 41 of the first and second embodiments.

In the third embodiment, the current control unit 70*b* changes the dither amplitude to a value determined in accordance with the temperature of the hydraulic fluid when the current that is supplied to the solenoid proportional valve 45 has a maximum current value that maximizes the opening of the solenoid proportional valve 45 or a specific current value that is smaller than the maximum current value by a predetermined value, and does not change the dither amplitude to the value determined in accordance with the temperature of the hydraulic fluid when the current that is supplied to the solenoid proportional valve 45 has neither the maximum current value nor the specific current value.

For example, the solenoid proportional valve 45 maximizes the opening when the current with the maximum current value is supplied. The flow rate of the hydraulic fluid that is supplied from the solenoid proportional valve 45 to the direction switching valve 41 is maximized, and the spool is moved to the stroke end position. That is, the spool reaches the stroke end. With regard to this, it can be said that the maximum current value is a current value for moving the spool to the stroke end.

For example, when the current that is supplied from the current control unit 70*b* to the solenoid proportional valve 45 (first pilot valve 46) has the maximum current value, the solenoid proportional valve 45 (first pilot valve 46) has the maximum opening, the hydraulic fluid supplied from the solenoid proportional valve 45 (first pilot valve 46) acts on the first pressure receiver 42, the direction switching valve 41 is switched from the neutral position 41*c* to the first position 41*a*, and the spool of the direction switching valve 41 in the first position 41*a* moves to a stroke end position (stroke end). Also, when the current that is supplied from the current control unit 70*b* to the solenoid proportional valve 45 (second pilot valve 47) has the maximum current value, the solenoid proportional valve 45 (second pilot valve 47) has the maximum opening, the hydraulic fluid supplied from the solenoid proportional valve 45 (second pilot valve 47) acts on the second pressure receiver 43, the direction switching valve 41 is switched from the neutral position 41*c* to the second position 41*b*, and the spool of the direction switching valve 41 in the second position 41*b* moves to a stroke end position (stroke end).

Also, when the current of the specific current value is supplied, the solenoid proportional valve 45 sets the opening to a value that is slightly smaller than the maximum value. The direction switching valve 41 is set so that the flow rate of the hydraulic fluid that is supplied from the solenoid proportional valve 45 becomes a value that is slightly smaller than the maximum value, and the spool moves to a near-side position (close position) that is slightly separated from the stroke end position. That is, the spool moves to the close position close to the stroke end. With regard to this, it can be said that the specific current value is a current value for moving the spool to the close position close to the stroke end.

For example, when the current that is supplied from the current control unit 70*b* to the solenoid proportional valve 45 (first pilot valve 46) has the specific current value, the solenoid proportional valve 45 (first pilot valve 46) has an opening that is slightly smaller than the maximum opening, the hydraulic fluid supplied from the solenoid proportional valve 45 (first pilot valve 46) acts on the first pressure receiver 42, the direction switching valve 41 is switched from the neutral position 41*c* to the first position 41*a*, and the spool of the direction switching valve 41 in the first position 41*a* moves to a near-side position (close position) that is slightly separated from the stroke end position (stroke end). Also, when the current that is supplied from the current control unit 70*b* to the solenoid proportional valve 45 (second pilot valve 47) has the specific current value, the solenoid proportional valve 45 (second pilot valve 47) has an opening that is slightly smaller than the maximum opening, the hydraulic fluid supplied from the solenoid proportional valve 45 (second pilot valve 47) acts on the second pressure receiver 43, the direction switching valve 41 is switched from the neutral position 41*c* to the second position 41*b*, and the spool of the direction switching valve 41 in the second position 41*b* moves to a near-side position (close position) that is slightly separated from the stroke end position (stroke end).

Note that the specific current value may be a current value obtained by subtracting a current value of the dither amplitude from the maximum current value. In this case, the spool is located short of the stroke end by a distance corresponding to a slight movement width of the spool.

That is, the current control unit 70*b* changes the dither amplitude in accordance with the temperature of the hydraulic fluid when the spool is in the stroke end position or at the predetermined near-side position before the stroke end position. In contrast, the current control unit 70*b* maintains the dither amplitude at a constant value regardless of the temperature of the hydraulic fluid when the spool is neither in the stroke end position nor at the near-side position.

<Control Process on Dither Amplitude in Accordance with Temperature of Hydraulic Fluid>

Figure 9:
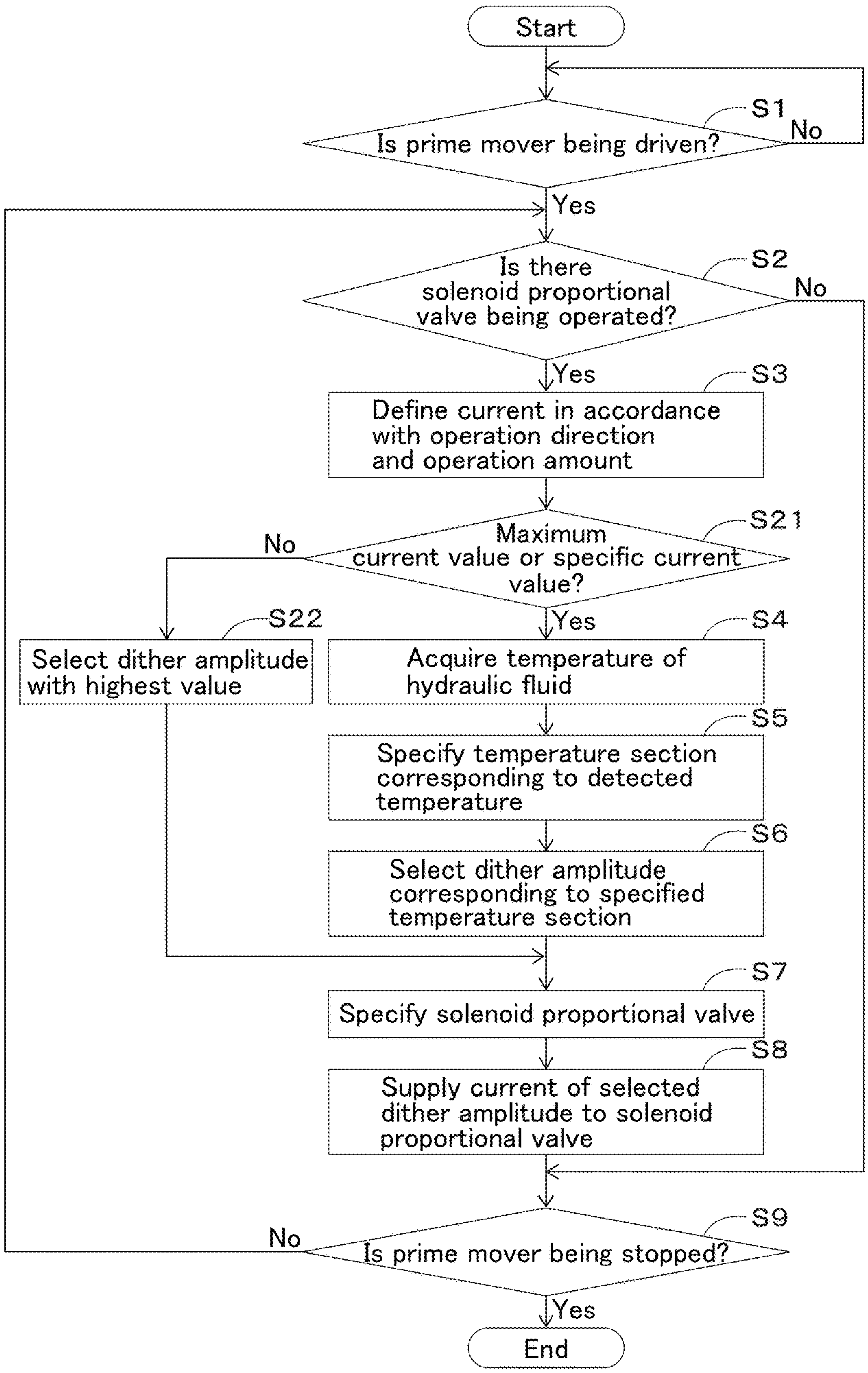
FIG. 9 is a flowchart presenting a control process on the dither amplitude in accordance with the temperature of the hydraulic fluid by the current control unit.

FIG. 9 is a flowchart presenting a control process on the dither amplitude in accordance with the temperature of the hydraulic fluid by the current control unit 70*b*. The flowchart presented in FIG. 9 is different from the flowchart presented in FIG. 6 in that S21 and S22 are added to the flowchart presented in FIG. 6.

As presented in FIG. 9, after the processing in S3, the current control unit 70*b* determines whether the current that is supplied to the solenoid proportional valve 45 has the maximum current value or the specific current value, or has neither the maximum current value nor the specific current value (S21). When determining that the current that is supplied to the solenoid proportional valve 45 has the maximum current value or the specific current value (S21, Yes), the current control unit 70*b* acquires the temperature of the hydraulic fluid detected by the temperature sensor 79 (S4). S5 to S9 are the same as those in the first embodiment, and hence the description thereof will be omitted here.

In contrast, when determining that the current that is supplied to the solenoid proportional valve 45 has neither the maximum current value nor the specific current value (S21, No), the current control unit 70*b* selects the dither amplitude with a highest value (S22). That is, the current control unit 70*b* sets the dither amplitude to a constant value (for example, a maximum value) regardless of the temperature of the hydraulic fluid.

<Effects>

The hydraulic system S of the working machine 1 of the above-described third embodiment includes a direction switching valve 41 including a spool to be movable from a stroke start position to a stroke end position by changing of an opening of the solenoid proportional valve 45 in accordance with a magnitude of the current that is supplied from the current control unit 70*b*, the spool being moved in proportion to a flow rate of the hydraulic fluid that is supplied from the solenoid proportional valve 45, to supply the hydraulic fluid with an amount in proportion to an amount of the movement of the spool to the hydraulic actuator AC. The current control unit 70*b* changes the dither amplitude to a value determined in accordance with the temperature of the hydraulic fluid when the current that is supplied to the solenoid proportional valve 45 has a maximum current value that maximizes the opening of the solenoid proportional valve 45 or a specific current value that is smaller than the maximum current value by a predetermined value, and does not change the dither amplitude to the value determined in accordance with the temperature of the hydraulic fluid when the current that is supplied to the solenoid proportional valve 45 has neither the maximum current value nor the specific current value.

According to this configuration, the current control unit 70*b* changes the dither amplitude to the value determined in accordance with the temperature of the hydraulic fluid when the current that is supplied to the solenoid proportional valve 45 has the maximum current value that maximizes the opening of the solenoid proportional valve 45 or the specific current value that is smaller than the maximum current value by the predetermined value, that is, when the spool is in a stroke end position or at a predetermined near-side position before the stroke end position. Thus, when the spool is in the stroke end position and at the near-side position close to the stroke end position, occurrence of a situation in which the spool vibrates in synchronization with pressure amplitude and strikes a spool cap can be prevented or reduced. Also, generation of pressure oscillation in a state in which the spool is pressed in the stroke end position can be reduced. Thus, the vibration sound generated or increased by the spool of the direction switching valve 41 as the temperature of the hydraulic fluid increases can be properly reduced. Also, when the current that is supplied to the solenoid proportional valve 45 has neither the maximum current value nor the specific current value, that is, when the spool is neither in the stroke end position nor at the near-side position, the current control unit 70*b* does not change the dither amplitude to the value determined in accordance with the temperature of the hydraulic fluid, and sets the dither amplitude to a maximum value. That is, when the spool is neither in the stroke end position nor at the near-side position, the vibration sound caused by the spool of the direction switching valve 41 is unlikely to be large, and hence the dither amplitude can be maintained at the maximum value regardless of the temperature of the hydraulic fluid. Thus, the hysteresis can be more effectively reduced, and a state with good operability can be ensured.

Fourth Embodiment

Hereinafter, a hydraulic system S of a working machine 1 of a fourth embodiment will be described focusing on a configuration different from the configuration of the above-described third embodiment. The same reference signs are given to the configurations common to the configurations of the third embodiment and the detailed description thereof will be omitted.

The fourth embodiment differs from the third embodiment in that the dither amplitude is changed in accordance with the temperature of the hydraulic fluid when the current of the solenoid proportional valve has the maximum current value or the specific current value, and the dither amplitude is not changed regardless of the temperature of the hydraulic fluid when the current of the solenoid proportional valve has neither the maximum current value nor the specific current value in the third embodiment, whereas in the fourth embodiment, the dither amplitude is changed in accordance with the temperature of the hydraulic fluid when the spool is in a stroke end position or at a predetermined near-side position before the stroke end position, and the dither amplitude is not changed regardless of the temperature of the hydraulic fluid when the spool is neither in the stroke end position nor at the near-side position.

Figure 10:
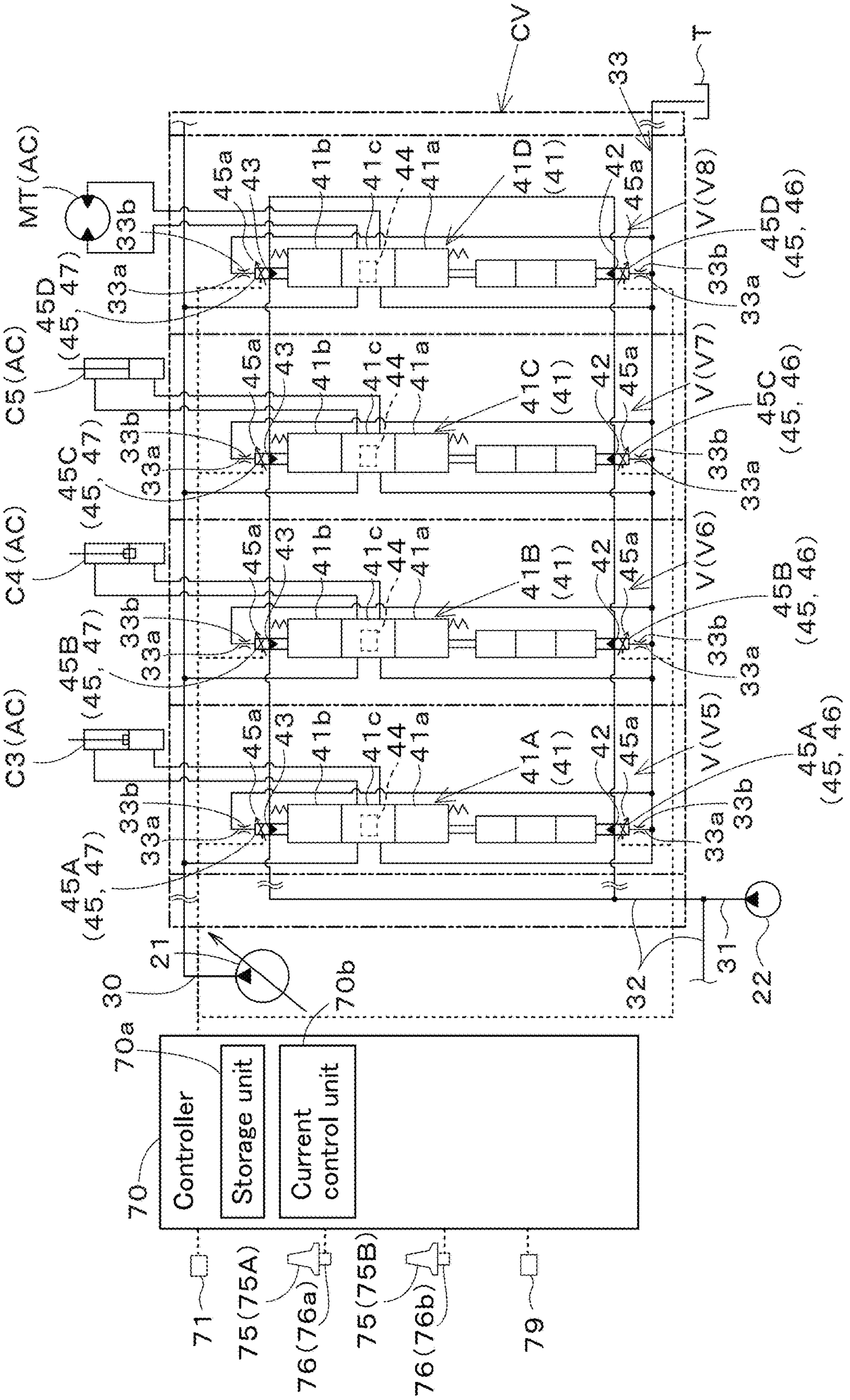
FIG. 10 is a hydraulic circuit diagram relating to the boom control valve, the arm control valve, the bucket control valve, and the turn control valve according to a fourth embodiment.

As illustrated in FIG. 10, the direction switching valve 41 of the fourth embodiment includes a position detection sensor 44 that detects the position of the spool.

In the fourth embodiment, the current control unit 70*b* can determine the position of the spool of the direction switching valve 41 based on a detection signal from the position detection sensor 44. The current control unit 70*b* changes the dither amplitude in accordance with the temperature of the hydraulic fluid when the spool is in a stroke end position (stroke end) or at a predetermined near-side position (close position) before the stroke end position (position that is slightly separated from the stroke end position (close position)), and sets the dither amplitude to a constant value regardless of the temperature of the hydraulic fluid when the spool is neither in the stroke end position nor at the near-side position.

Note that the near-side position may be a position at which the spool is located short of the stroke end by a distance corresponding to a slight movement width of the spool.

<Control Process on Dither Amplitude in Accordance with Temperature of Hydraulic Fluid>

Figure 11:
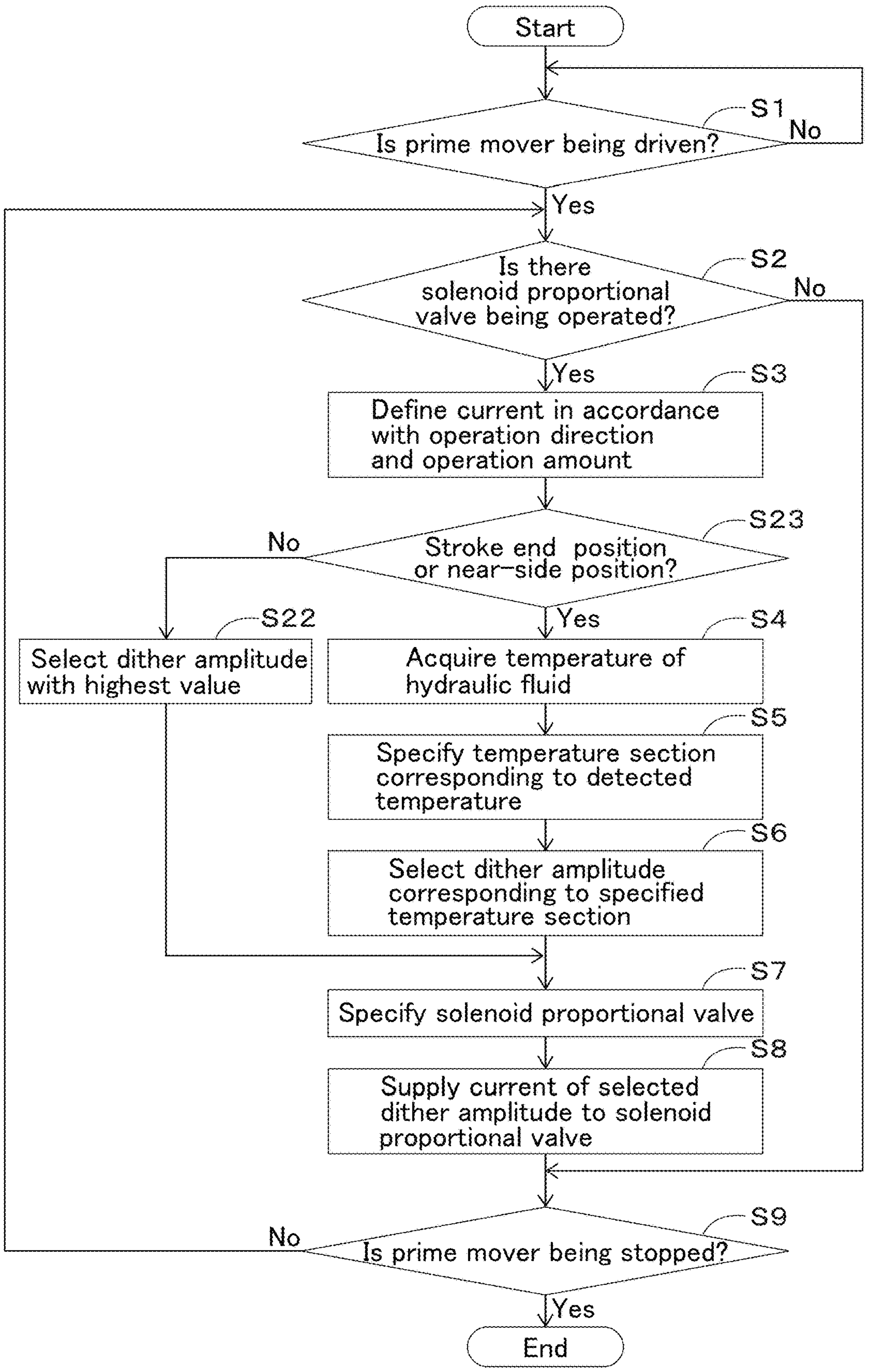
FIG. 11 is a flowchart presenting a control process on the dither amplitude in accordance with the temperature of the hydraulic fluid by the current control unit.

Hereinafter, a process of setting the dither amplitude of the current based on the temperature of the hydraulic fluid by the current control unit 70*b* will be described in detail with reference to FIG. 11. FIG. 11 is a flowchart presenting a control process on the dither amplitude in accordance with the temperature of the hydraulic fluid by the current control unit 70*b*. The flowchart presented in FIG. 11 is different from the flowchart presented in FIG. 9 in that S23 is added to the flowchart presented in FIG. 9 instead of S21.

As presented in FIG. 11, after the processing in S3, the current control unit 70*b* determines whether the spool of the direction switching valve 41 is in the stroke end position or at the predetermined near-side position before the stroke end position, or is neither in the stroke end position nor at the near-side position, based on a detection signal from the position detection sensor 44 (S23). When determining that the spool of the direction switching valve 41 is in the stroke end position or at the predetermined near-side position before the stroke end position (S23, Yes), the current control unit 70*b* acquires the temperature of the hydraulic fluid detected by the temperature sensor 79 (S4). S5 to S9 are the same as those in the third embodiment, and hence the description thereof will be omitted here.

In contrast, when determining that the spool of the direction switching valve 41 is neither in the stroke end position nor at the near-side position based on a detection signal from the position detection sensor 44 (S23, No), the current control unit 70*b* selects the dither amplitude with a highest value (S22). That is, the current control unit 70*b* sets the dither amplitude to a constant value (for example, a maximum value) regardless of the temperature of the hydraulic fluid.

The hydraulic system S of the working machine 1 of the above-described fourth embodiment includes a direction switching valve 41 including a spool to be movable from a stroke start position to a stroke end position, the spool being moved in proportion to a flow rate of the hydraulic fluid that is supplied from the solenoid proportional valve 45, to supply the hydraulic fluid with an amount in proportion to an amount of the movement of the spool to the hydraulic actuator AC. The current control unit 70*b* changes the dither amplitude to a value determined in accordance with the temperature of the hydraulic fluid when the spool of the direction switching valve 41 is in the stroke end position or at a near-side position, and does not change the dither amplitude to the value determined in accordance with the temperature of the hydraulic fluid when the spool of the direction switching valve 41 is neither in the stroke end position nor at the near-side position.

According to this configuration, effects similar to those of the above-described third embodiment can be obtained.

Fifth Embodiment

Figure 12:
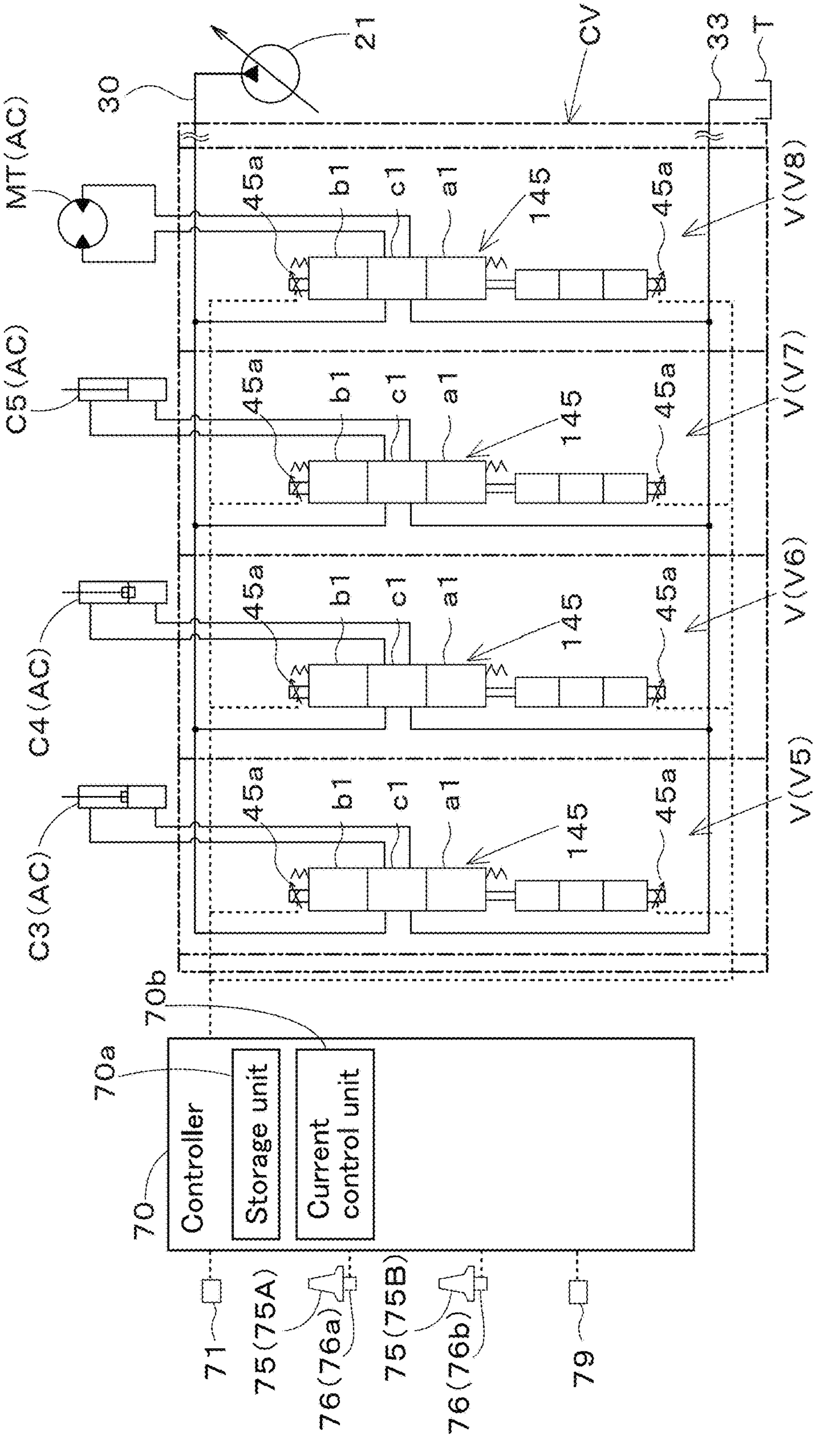
FIG. 12 is a hydraulic circuit diagram relating to the boom control valve, the arm control valve, the bucket control valve, and the turn control valve according to a fifth embodiment.

FIG. 12 is a hydraulic circuit diagram relating to the boom control valve, the arm control valve, the bucket control valve, and the turn control valve according to a fifth embodiment.

Hereinafter, a hydraulic system S of a working machine 1 of the fifth embodiment will be described focusing on a configuration different from the configuration of the above-described first embodiment. The same reference signs are given to the configurations common to the configurations of the first embodiment and the detailed description thereof will be omitted. In the hydraulic system S of the working machine 1 of the fifth embodiment, unlike the first embodiment, the control valve V employs, for example, a direct-acting type solenoid valve 145. The direct-acting type solenoid valve 145 is a valve in which a proportional solenoid 45*a* moves in accordance with the magnitude of the current that is supplied, and the proportional solenoid 45*a* moves a spool to control the flow of the hydraulic fluid.

The direct-acting type solenoid valve 145 can be switched among a first position a1, a second position b1, and a neutral position c1. The direct-acting type solenoid valve 145 is held in the neutral position c1 by urging forces of a neutral spring on one side in a switching direction and a neutral spring on another side opposite to the one side, and is switched from the neutral position c1 to the first position a1 or the second position b1 by the proportional solenoid 45*a* moving the spool.

<Effects>

Additionally, in the hydraulic system S of the working machine 1 of the fifth embodiment, each control valve V included in the control valve unit CV may include a direct-acting type solenoid valve 145. The current control unit 70*b* may change the dither amplitude of the current that is supplied to the solenoid valve 145 of the control valve V to a value determined in accordance with the temperature of the hydraulic fluid.

Note that in the above-described first to fourth embodiments, the control valve unit CV (composite control valve:

multiple control valve) in which the plurality of control valves V are coupled is used. However, the plurality of control valves V may be individually separated control valves, that is, the control valves V in each of which the solenoid proportional valve 45 and the direction switching valve 41 are integrally configured may be used, and the current control unit 70*b* may change the dither amplitude of the current that is supplied to the solenoid proportional valve 45 of the control valve V to a value determined in accordance with the temperature of the hydraulic fluid. According to this configuration, even in the control valve V, the vibration sound of the control valve V caused by the temperature of the hydraulic fluid can be reduced.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system of a working machine, comprising:

a hydraulic actuator to be driven with a hydraulic fluid;

a solenoid proportional valve to control the hydraulic actuator in accordance with a current that is supplied; and a controller to control the current that is supplied to the solenoid proportional valve, wherein the controller changes a dither amplitude of the current that is supplied to the solenoid proportional valve in accordance with a temperature of the hydraulic fluid, the hydraulic system further includes a direction switching valve including a spool to be movable from a stroke start position to a stroke end position in proportion to a flow rate of the hydraulic fluid that is supplied from the solenoid proportional valve, to supply the hydraulic fluid with an amount corresponding to a position of the spool to the hydraulic actuator, wherein the solenoid proportional valve switches the flow rate of the hydraulic fluid that is supplied to the direction switching valve by changing of an opening of the solenoid proportional valve in accordance with a magnitude of the current that is supplied from the controller, and the controller changes the dither amplitude in accordance with the temperature of the hydraulic fluid when the current that is supplied to the solenoid proportional valve has a maximum current value that maximizes the opening of the solenoid proportional valve or a specific current value that is smaller than the maximum current value by a predetermined value, and sets the dither amplitude to a constant value regardless of the temperature of the hydraulic fluid when the current that is supplied to the solenoid proportional valve has neither the maximum current value nor the specific current value.

2. The hydraulic system of the working machine according to claim 1, wherein the controller sets the dither amplitude to a predetermined first value when the temperature of the hydraulic fluid is a first temperature, and changes the dither amplitude to a predetermined second value that is smaller than the first value when the temperature of the hydraulic fluid is a second temperature that is higher than the first temperature.

3. The hydraulic system of the working machine according to claim 1, wherein the controller divides a temperature range of the hydraulic fluid into a plurality of sections to set a plurality of temperature sections that are arranged in ascending order of the temperature, and decreases stepwise a value of the dither amplitude that is set for each of the plurality of temperature sections in ascending order of the plurality of temperature sections.

4. The hydraulic system of the working machine according to claim 1, wherein the controller continuously decreases the dither amplitude as the temperature of the hydraulic fluid increases.

5. The hydraulic system of the working machine according to claim 1, comprising:

a control valve in which the solenoid proportional valve and the direction switching valve are integrally configured, wherein the controller changes the dither amplitude of the current that is supplied to the solenoid proportional valve of the control valve to a value determined in accordance with the temperature of the hydraulic fluid.

6. The hydraulic system of the working machine according to claim 1, comprising:

a composite control valve in which a plurality of control valves in each of which the solenoid proportional valve and the direction switching valve are integrally configured are coupled, wherein the controller changes the dither amplitude of the current that is supplied to a plurality of the solenoid proportional valves of the composite control valve to a value determined in accordance with the temperature of the hydraulic fluid.

7. The hydraulic system of the working machine according to claim 1, comprising:

a hydraulic fluid tank to store the hydraulic fluid; and a temperature sensor to detect the temperature of the hydraulic fluid stored in the hydraulic fluid tank, wherein the controller changes the dither amplitude of the current that is supplied to the solenoid proportional valve in accordance with the temperature of the hydraulic fluid detected by the temperature sensor.

8. A hydraulic system of a working machine, comprising:

a hydraulic actuator to be driven with a hydraulic fluid;

a solenoid proportional valve to control the hydraulic actuator in accordance with a current that is supplied; and a controller to control the current that is supplied to the solenoid proportional valve, wherein the controller changes a dither amplitude of the current that is supplied to the solenoid proportional valve in accordance with a temperature of the hydraulic fluid, the hydraulic system further includes a direction switching valve including a spool to be movable from a stroke start position to a stroke end position, the spool being moved in proportion to a flow rate of the hydraulic fluid that is supplied from the solenoid proportional valve, to supply the hydraulic fluid corresponding to an amount of the movement of the spool to the hydraulic actuator, wherein the controller changes the dither amplitude in accordance with the temperature of the hydraulic fluid when the spool is in the stroke end position or at a predetermined near-side position before the stroke end position, and sets the dither amplitude to a constant value regardless of the temperature of the hydraulic fluid when the spool is neither in the stroke end position nor at the near-side position.

9. The hydraulic system of the working machine according to claim 8, comprising:

a control valve in which the solenoid proportional valve and the direction switching valve are integrally configured, wherein the controller changes the dither amplitude of the current that is supplied to the solenoid proportional valve of the control valve to a value determined in accordance with the temperature of the hydraulic fluid.

10. The hydraulic system of the working machine according to claim 8, comprising:

a composite control valve in which a plurality of control valves in each of which the solenoid proportional valve and the direction switching valve are integrally configured are coupled, wherein the controller changes the dither amplitude of the current that is supplied to a plurality of the solenoid proportional valves of the composite control valve to a value determined in accordance with the temperature of the hydraulic fluid.

11. The hydraulic system of the working machine according to claim 8, wherein the controller sets the dither amplitude to a predetermined first value when the temperature of the hydraulic fluid is a first temperature, and changes the dither amplitude to a predetermined second value that is smaller than the first value when the temperature of the hydraulic fluid is a second temperature that is higher than the first temperature.

12. The hydraulic system of the working machine according to claim 8, wherein the controller divides a temperature range of the hydraulic fluid into a plurality of sections to set a plurality of temperature sections that are arranged in ascending order of the temperature, and decreases stepwise a value of the dither amplitude that is set for each of the plurality of temperature sections in ascending order of the plurality of temperature sections.

13. The hydraulic system of the working machine according to claim 8, wherein the controller continuously decreases the dither amplitude as the temperature of the hydraulic fluid increases.

* * * * *